(12) United States Patent
Wayans et al.

(10) Patent No.: US 9,544,649 B2
(45) Date of Patent: Jan. 10, 2017

(54) DEVICE AND METHOD FOR CAPTURING VIDEO

(71) Applicant: Aniya's Production Company, Los Angeles, CA (US)

(72) Inventors: Damon Wayans, Los Angeles, CA (US); James Cahall, Carlsbad, CA (US)

(73) Assignee: Aniya's Production Company, Los Angeles, CA (US)

( * ) Notice: Subject to any disclaimer, the term of this patent is extended or adjusted under 35 U.S.C. 154(b) by 0 days.

(21) Appl. No.: 14/189,598

(22) Filed: Feb. 25, 2014

(65) Prior Publication Data

US 2015/0156552 A1  Jun. 4, 2015

Related U.S. Application Data

(60) Provisional application No. 61/911,362, filed on Dec. 3, 2013.

(51) Int. Cl.

| | | |
|---|---|---|
| G11B 27/00 | (2006.01) |
| H04N 5/93 | (2006.01) |
| H04N 21/472 | (2011.01) |
| G11B 27/036 | (2006.01) |
| G11B 20/10 | (2006.01) |
| H04N 5/77 | (2006.01) |
| H04N 9/82 | (2006.01) |
| H04N 21/422 | (2011.01) |
| H04N 21/4223 | (2011.01) |
| H04N 21/433 | (2011.01) |
| H04N 21/81 | (2011.01) |
| G06F 3/00 | (2006.01) |
| G06F 3/16 | (2006.01) |
| G06F 3/048 | (2013.01) |

(52) U.S. Cl.
CPC ......... *H04N 21/47205* (2013.01); *G11B 20/10* (2013.01); *G11B 27/036* (2013.01); *H04N 5/772* (2013.01); *H04N 9/8205* (2013.01); *H04N 9/8227* (2013.01); *H04N 21/4223* (2013.01); *H04N 21/42224* (2013.01); *H04N 21/4334* (2013.01); *H04N 21/8153* (2013.01)

(58) Field of Classification Search
CPC ............. G11B 27/00; H04N 5/93; G06F 3/00; G06F 3/16; G06F 3/048
USPC  386/278, 280, 282, 285, 286, 288; 715/700, 704, 716, 719, 723, 727, 728, 715/732, 763

See application file for complete search history.

(56) References Cited

U.S. PATENT DOCUMENTS

| | | | |
|---|---|---|---|
| 6,339,760 B1 * | 1/2002 | Koda et al. | 704/278 |
| 2012/0233571 A1 * | 9/2012 | Wever et al. | 715/835 |
| 2013/0053107 A1 * | 2/2013 | Kang et al. | 455/566 |
| 2014/0376887 A1 * | 12/2014 | Tijssen et al. | 386/282 |
| 2015/0058709 A1 * | 2/2015 | Zaletel | 715/202 |

FOREIGN PATENT DOCUMENTS

JP  2005198068 A  *  7/2005  ............. H04N 5/225

* cited by examiner

*Primary Examiner* — Daquan Zhao

(57) ABSTRACT

A device and method are presently disclosed. The computer implemented method, includes at an electronic device with a touch-sensitive display, displaying a still image on the touch-sensitive display, while displaying the still image, detecting user's finger contact with the touch-sensitive display, and in response to detecting the user's finger contact, video recording the still image.

3 Claims, 36 Drawing Sheets

DEVICE AND METHOD FOR CAPTURING VIDEO

CROSS REFERENCE TO RELATED APPLICATIONS

This application claims the benefit of U.S. Provisional Application No. 61/911,362, filed on Dec. 3, 2012, which is incorporated herein by reference in its entirety.

FIELD

The present invention relates to electronic devices. More particularly, the present invention relates to electronic devices configured to capture video.

BACKGROUND

As known in the art, creating music videos requires initially recording a video followed by adding sound (i.e. music) during a separate editing process. This is very time consuming and costly.

As known in the art, to make a video of a still image requires positioning a video camera above the printed image and videotaping the printed image. This is also very time consuming as it requires the video camera to be positioned at such an angle as to hide the edges of the printed image and to remove any glare if the printed image is printed on a glossy paper.

As known in the art, to combine two videos requires users to separately record each video and use a separate editing process to combine them into one. This is also very time consuming and costly.

Embodiments disclosed in the present disclosure overcome the limitations of the prior art.

Figure 1:
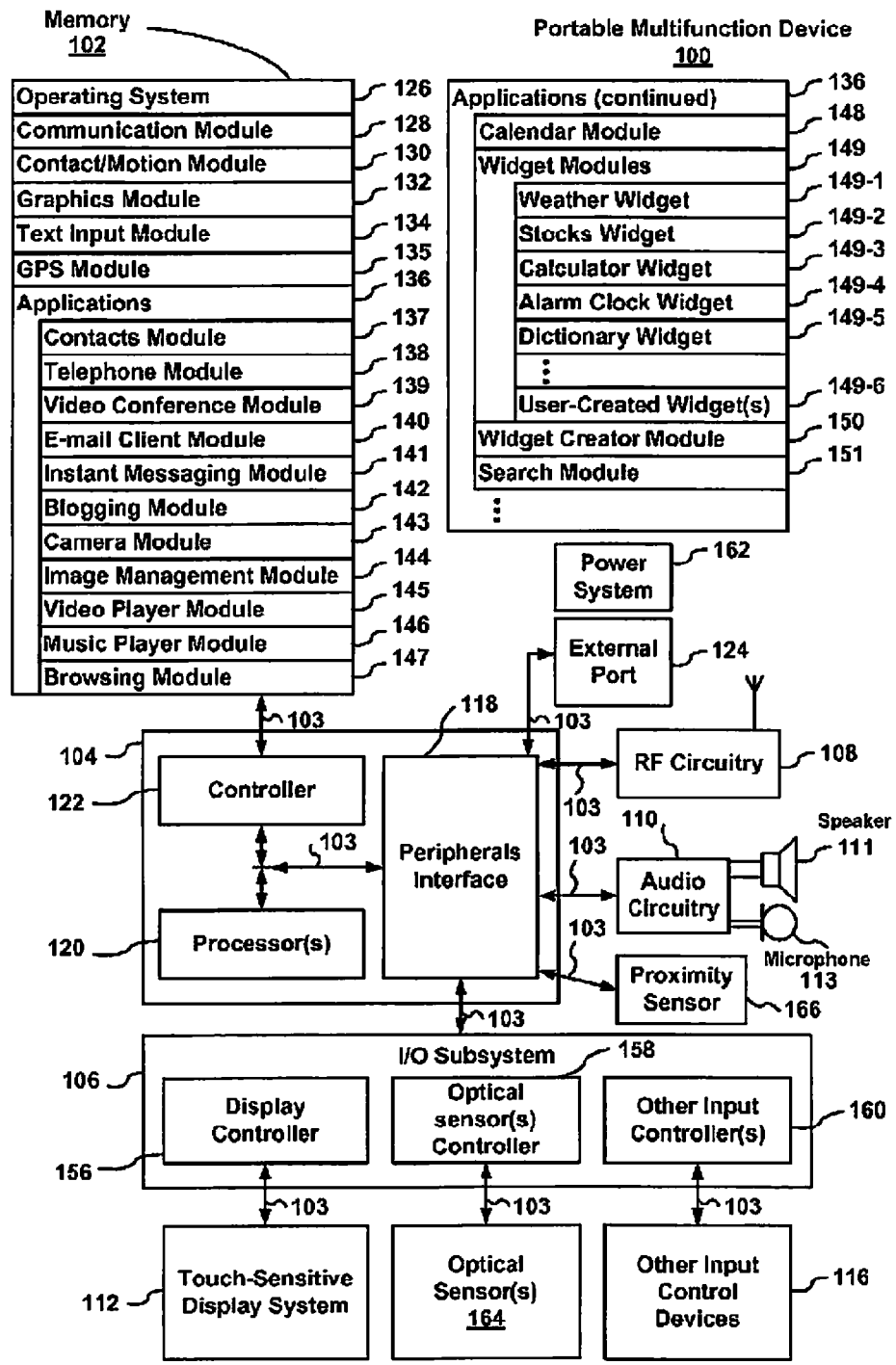
FIG. 1 depicts a block diagram of a portable device as known in the art.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to provide embodiments of the invention and that other alternative mechanical configurations are possible.

An electronic device 100 as known in the art is shown in FIG. 1. The device 100 may comprise a memory 102 (which may comprise one or more computer readable storage mediums), an input/output (I/O) subsystem 106, a memory controller 122, one or more processing units (CPU's) 120, a peripherals interface 118, an audio circuitry 110, a speaker 111, a microphone 113, and one or more optical sensors 164 in accordance with some embodiments. These components may communicate over one or more communication buses or signal lines 103.

The memory 102 may comprise high-speed random access memory and/or non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device 100 to the CPU 120 and memory 102. The one or more processors 120 run or execute various software programs and/or sets of instructions stored in memory 102 to perform various functions for the device 100 and to process data. The peripherals interface 118, the CPU 120, and the memory controller 122 may be implemented on a single chip, such as a chip 104. In some other embodiments, they may be implemented on separate chips.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 by the peripherals interface 118. The audio circuitry 110 may also comprise a headset/speaker jack (not shown). The headset jack provides an interface between the audio circuitry 110 and removable audio input/output peripherals, such as speaker, output-only headphones and/or a headset with both output (e.g., a headphone for one or both ears) and input (e.g., a microphone).

The device 100 may further comprise a touch-sensitive display 112, other input or control devices 116, radio frequency (RF) circuitry 108, and/or an external port 124 in accordance with some embodiments. These components may also communicate over one or more communication buses or signal lines 103.

As known in the art, the device 100 as shown in FIG. 1 may comprise more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

In one embodiment, the device 100 is a cellular phone. In another embodiment, the device 100 is a video camera. In another embodiment, the device 100 is a camera. In another embodiment, the device 100 is a video camera. In another embodiment, the device 100 is a computer. In another embodiment, the device 100 is a portable computer. In another embodiment, the device 100 is a tablet.

The device 100 may also comprise a radio frequency (RF) circuitry 108. The RF circuitry 108 may be configured to receive and transmit RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include one or more physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (not shown) may include an up/down button for volume control of the speaker 111 and/or the microphone 113.

The touch-sensitive display 112 is sometimes called a "touch screen" for convenience, and may also be known as or called a touch-sensitive display system. In one embodiment, the touch-sensitive touch screen 112 provides an input interface and an output interface between the device 100 and a user. The touch screen 112 is configured to implement virtual or soft buttons and one or more soft keyboards. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

The touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In one embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution of 100 dpi to 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In addition to the touch screen 112, the device 100 may comprise a touchpad (not shown) for activating or deactivating particular functions. The touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

The device 100 may also comprise a physical or virtual click wheel (not show) as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semi-transparent object that appears and disappears on the touch screen display in response to user interaction with the device. In some embodiments, a virtual click wheel is displayed on the touch screen of a portable multifunction device and operated by user contact with the touch screen.

The device 100 may further comprise a power system 162 for powering the various components. The power system 162 may comprise a power management system, one or more power sources (e.g., battery, alternating current (AC)), a recharging system, a power failure detection circuit, a power converter or inverter, a power status indicator (e.g., a light-emitting diode (LED)) and/or any other components associated with the generation, management and distribution of power in portable devices.

The optical sensor 164 of the device 100 may be electrically coupled with an optical sensor controller 158 in I/O subsystem 106. The optical sensor 164 may comprise charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture visual media (i.e. still images or video). In some embodiments, the optical sensor 164 may be located on the back of the device 100, opposite the touch screen display 112 on the front of the device 100, so that the touch screen display 112 may be used as a viewfinder for either still and/or video image acquisition. In some embodiments, the optical sensor 164 may be located on the front of the device 100 to capture image(s) of the user. In some embodiments, one optical sensor 164 may be located on the back of the device 100 and another optical sensor 164 may be located on the front of the device 100. In some embodiments, the position of the optical sensor 164 may be changed by the user (e.g., by rotating the lens and the sensor in the device housing) so that a single optical sensor 164 may be used along with the touch screen display to capture still and/or video image.

The device 100 may also comprise one or more accelerometers 168. FIG. 1 shows an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference in their entirety. Information may be displayed on the touch screen display 112 in a portrait view or a landscape view based on an analysis of data received from the one or more accelerometers 168.

As known in the art, the memory 102 may be configured to store one or more software components as described below.

The memory 102 may be configured to store an operating system 126. The operating system 126 (e.g., Darwin, RTXC, LINUX, UNIX, OS X, WINDOWS, or an embedded operating system such as VxWorks) comprises various software components and/or drivers for controlling and managing general system tasks (e.g., memory management, storage device control, power management, etc.) and facilitates communication between various hardware and software components.

The memory 102 may also be configured to store a communication module 128. The communication module 128 facilitates communication with other devices over one or more external ports 124 and also includes various software components for handling data received by the RF circuitry 108 and/or the external port 124. In one embodiment, the external port 124 (e.g., Universal Serial Bus (USB), FIREWIRE, etc.) is configured for coupling directly to other devices or indirectly over a network (e.g., the Internet, wireless LAN, etc.).

The memory 102 may be configured to store a contact/motion module 130. The contact/motion module 130 is configured to detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module 130 and the display controller 156 may also detect contact on a touchpad. The contact/motion module 130 and the controller 160 may further detect contact on a click wheel.

The memory 102 may be configured to store a graphics module 132. The graphics module 132 comprises various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The memory 102 may also be configured to store a text input module 134. The text input module 134, which may be a component of graphics module 132, provides soft keyboards for entering text in various applications that need text input.

The memory 102 may be configured to store a GPS module 135. The GPS module 135 determines the location of the device and provides this information for use in various applications (e.g., to camera module 143 as picture/video metadata).

The memory 102 may be configured to store applications 136. The applications 136 may comprise one or more of the following modules (or sets of instructions), or a subset or superset thereof: a camera module 143 for still and/or video images; an image management module 144; a video player module 145; a music player module 146; and/or online video module 155.

As known in the art, applications 136 may comprise additional modules (or sets of instructions). For example, other applications 136 that may be stored in memory 102 may include one or more of the following: a contacts module 137 (sometimes called an address book or contact list); a telephone module 138; a video conferencing module 139; an e-mail client module 140; an instant messaging (IM) module 141; a blogging module 142; a browser module 147; a calendar module 148; widget modules 149, which may include weather widget 149-1, stocks widget 149-2, calculator widget 149-3, alarm clock widget 149-4, dictionary widget 149-5, and other widgets obtained by the user, as well as user-created widgets 149-6; widget creator module 150 for making user-created widgets 149-6; search module 151; notes module 153; map module 154; word processing applications; JAVA-enabled applications; encryption; digital rights management; voice recognition; and/or voice replication.

As known in the art, the camera module 143 (in conjunction with, for example, touch screen 112, display controller 156, optical sensor(s) 164, optical sensor controller 158, contact module 130, graphics module 132, and image management module 144) may be configured to capture still images or video (including a video stream) and store them into memory 102, modify characteristics of a still image or video, or delete a still image or video from memory 102.

As known in the art, the image management module 144 (in conjunction with, for example, touch screen 112, display controller 156, contact module 130, graphics module 132, text input module 134, and camera module 143) may be configured to arrange, modify or otherwise manipulate, label, delete, present (e.g., in a digital slide show or album), and store still and/or video images.

As known in the art, the video player module 145 (in conjunction with, for example, touch screen 112, display controller 156, contact module 130, graphics module 132, audio circuitry 110, and speaker 111) may be configured to display, present or otherwise play back videos (e.g., on the touch screen 112 or on an external, connected display via external port 124).

As known in the art, the online video module 155 (in conjunction with, for example, touch screen 112, display system controller 156, contact module 130, graphics module 132, audio circuitry 110, speaker 111, RF circuitry 108,) may be configured to allow the user to access, browse, receive (e.g., by streaming and/or download), play back (e.g., on the touch screen 112 or on an external, connected display via external port 124), upload and/or otherwise manage online videos in one or more file formats, such as, for example, H.264.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module. The memory 102 may store a subset of the modules and data structures identified above. Furthermore, memory 102 may store additional modules and data structures not described above.

The device 100 may be configured so as to allow operation of a predefined set of functions on the device be performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad may include navigation between user interfaces. In some embodiments, the touchpad, when touched by the user, navigates the device 100 to a main, home, or root menu from any user interface that may be displayed on the device 100.

Contrary to the prior art, in some embodiments presently disclosed, the device 100 is configured to capture still images and/or video (including a video stream) while playing audio (i.e. music) through the speaker 111 (or another external speaker configured to play audio from the audio circuitry 110) and store them into memory. In one embodiment, this may be accomplished by configuring the camera module 143 (in conjunction with, for example, touch screen 112, display controller 156, optical sensor(s) 164, optical sensor controller 158, contact module 130, graphics module 132, audio circuitry 110, speaker 111 and image management module 144) to capture still images and/or video (including a video stream) while playing audio (i.e. music) through the speaker 111 (or another external speaker configured to play audio from the audio circuitry 110) and store them into memory 102, modify characteristics of a still image and/or video, or delete a still image and/or video from memory 102.

FIGS. 2-16 illustrate user interfaces for a camera application that may be implemented, for example, in the device 100 or other electronic devices in accordance with some embodiments presently disclosed. In some embodiments presently disclosed, a computer-implemented method is performed at an electronic device (e.g., 100) with a touch screen display 112.

Figure 2:
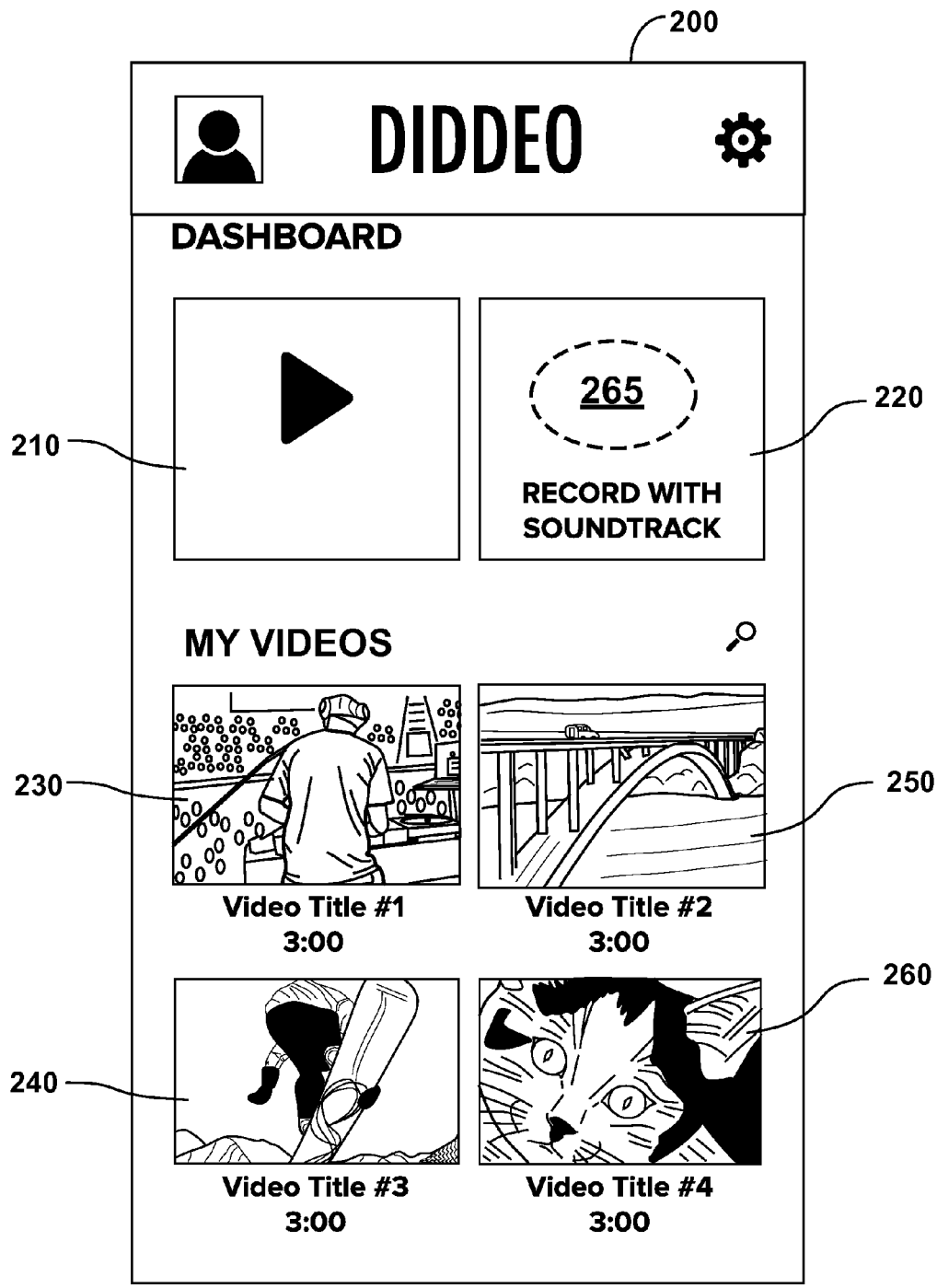
FIG. 2 depicts a user interface in accordance with some embodiments presently disclosed.
Figure 3:
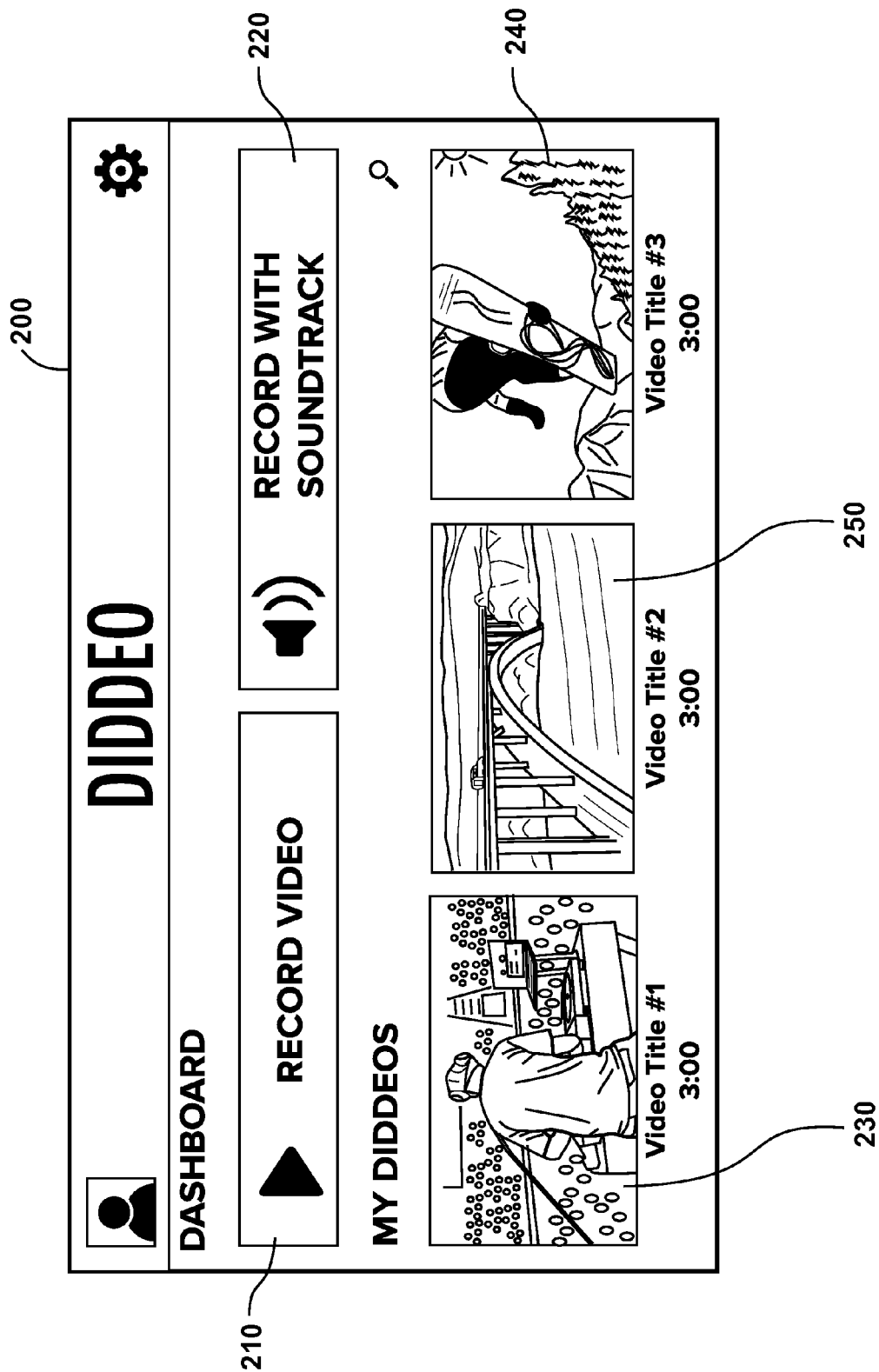
FIG. 3 depicts the user interface shown in FIG. 2 in landscape view.
Figure 4:
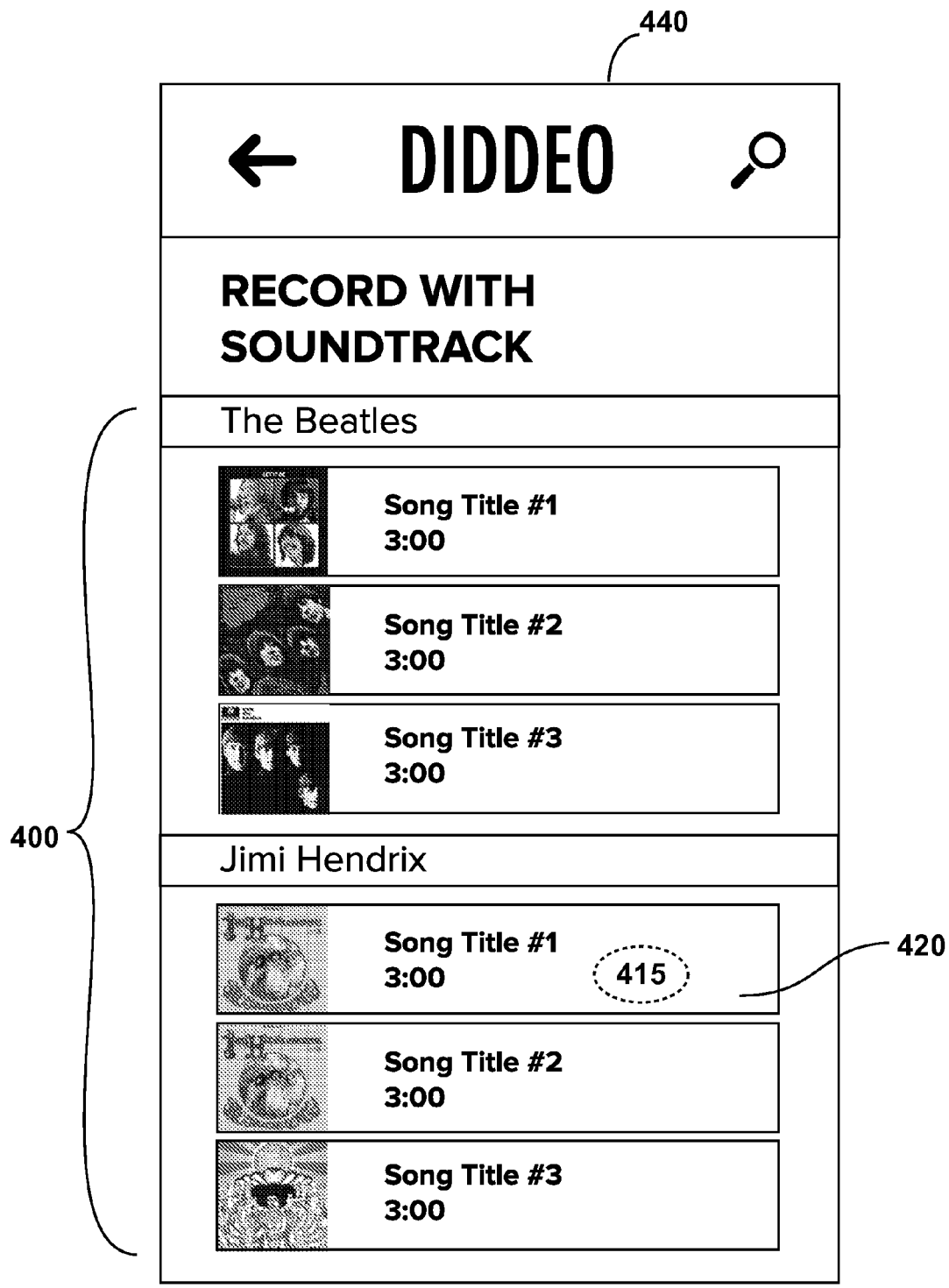
FIG. 4 depicts another user interface in accordance with some embodiments presently disclosed.

In some embodiments, in response to a series of gestures (e.g. finger taps) by the user, the device 100 displays a home screen 200 with one or more icons (i.e. virtual buttons) 210 and/or 220 as shown in FIGS. 2 and 3. Information may be displayed in a portrait view (shown in FIG. 2) or a landscape view (shown in FIG. 3) based on an analysis of data received from the one or more accelerometers 168.

In some embodiments, in response to a series of gestures (e.g. finger taps) by the user, the device 100 displays list and/or one or more icons 230, 240, 250, 260 corresponding to one or more videos stored in the device 100.

In one embodiment, in response to detecting a finger contact 265 (shown in FIG. 2) on the touch screen display 1112 of the device 100, the device 100 displays a music screen 440 with a list 400 of audio files stored, for example, in the memory 102 of the device 100. In another embodiment, in response to detecting a finger contact 265 (shown in FIG. 2) on the touch screen display 112 of the device 100, the device 100 displays a music screen 440 with a list 400 of audio files stored in a remote computer (not shown) and available for play on the device 100 and/or available for download to the device 100.

Figure 5:
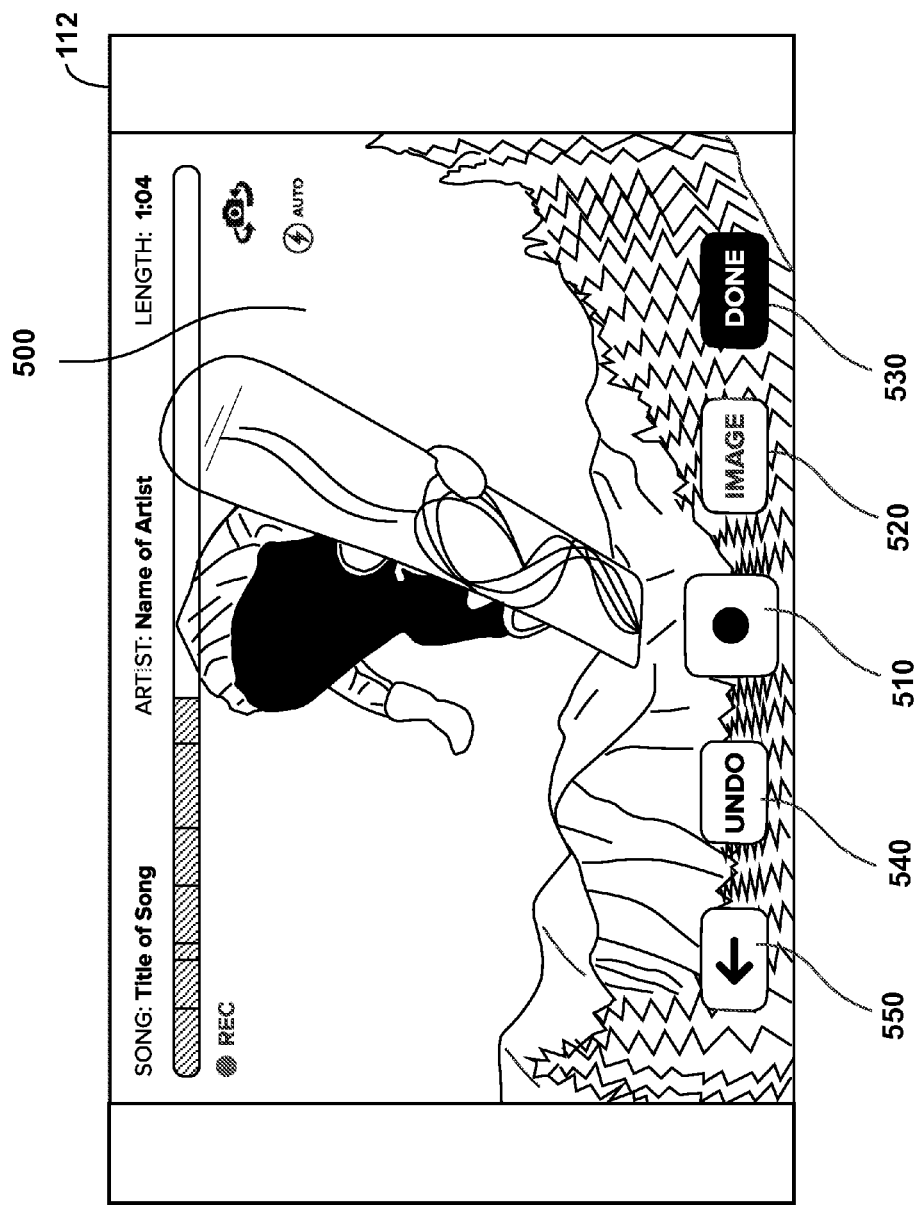
FIGS. 5-11 depict another user interface in accordance with some embodiments presently disclosed.
Figure 6:
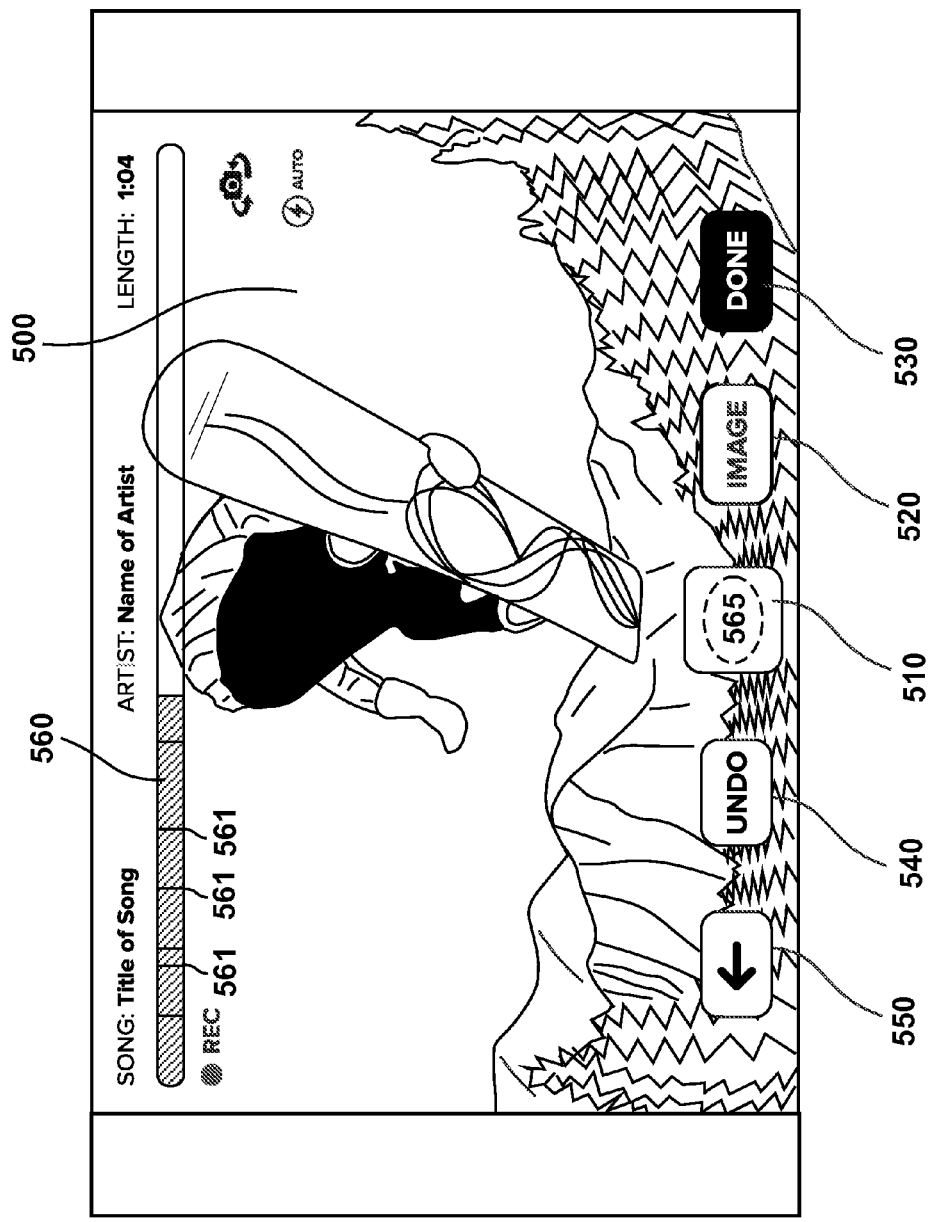

In one embodiment, in response to detecting a finger contact 415 (shown in FIG. 4) on the touch screen display 112 of the device 100, an audio file 420 is selected and the device 100 displays video camera screen 500 on the touch screen display 112 (as shown in FIG. 5). In this embodiment, the video camera screen 500 displays on the touch screen display 112 images of objects/people positioned in front of the optical sensor 164. In one embodiment, the video camera screen 500 is displayed in the portrait view (not shown) or a landscape view (as shown in FIG. 5).

In some embodiments, the device 100 displays one or more record controls associated with the video camera screen 500. In some embodiments, the one or more record controls comprise a record icon 510, an image icon 520, a done icon 530, an undo icon 540, a return icon 550, and/or a progress bar icon 560 as shown in FIG. 5. In some embodiments, displaying one or more record controls comprises displaying one or more record controls on top of the video camera screen 500 (not shown). In some embodiments, displaying one or more record controls comprises displaying one or more record controls on bottom of the video camera screen 500 (as shown in FIG. 5).

In some embodiments, while recording one or more images, the device 100 ceases to display the one or more playback controls. In some embodiments, ceasing to display the one or more playback controls comprises fading out the one or more playback controls. In some embodiments, the display of the one or more playback controls is ceased after a predetermined time. In some embodiments, the display of the one or more playback controls is ceased after no contact is detected with the touch screen display for a predetermined time.

In some embodiments, if the record icon 510 is activated by a finger contact 565 (shown in FIG. 6), the device 100 initiates video recording of objects/people positioned in front of the optical sensor 164 and the device 100 initiates the playing of the audio file 420 through the speaker 111. In some embodiments, the device 100 continues video recording as long as the record icon 510 is being activated by the finger contact 565. In some embodiments, the device 100 pauses video recording as soon as the finger contact 565 is removed from the record icon 510. In some embodiments, the user can record multiple video segments by starting and pausing video recording multiple times by applying and removing finger contact 565 to and from the record icon 510. In some embodiments, the device 100 plays the audio file 420 through the speaker 111 only while the record icon 510 is being activated by the finger contact 565. In some embodiments, video recording and playing of the audio file 420 is started and paused by applying finger contact 565 to and from the record icon 510. In some embodiments, the progress of video recording is shown in the progress bar icon 560. In some embodiments, presently disclosed camera application generates one or more markers 561 in the progress bar icon 560 every time the user pauses video recording by removing finger contact 565. In some embodiments, each marker 561 represents an end of a video segment(s) preceding it. In one embodiment, each video segment recorded by the user is stored in, for example, memory 102 as a separate video file (not shown).

In one embodiment, upon re-activation of the record icon 510, the device 100 will resume the playback of the audio file 420 from the same place it was paused when the record icon 510 was deactivated by the removal of the finger contact 565.

Figure 33:
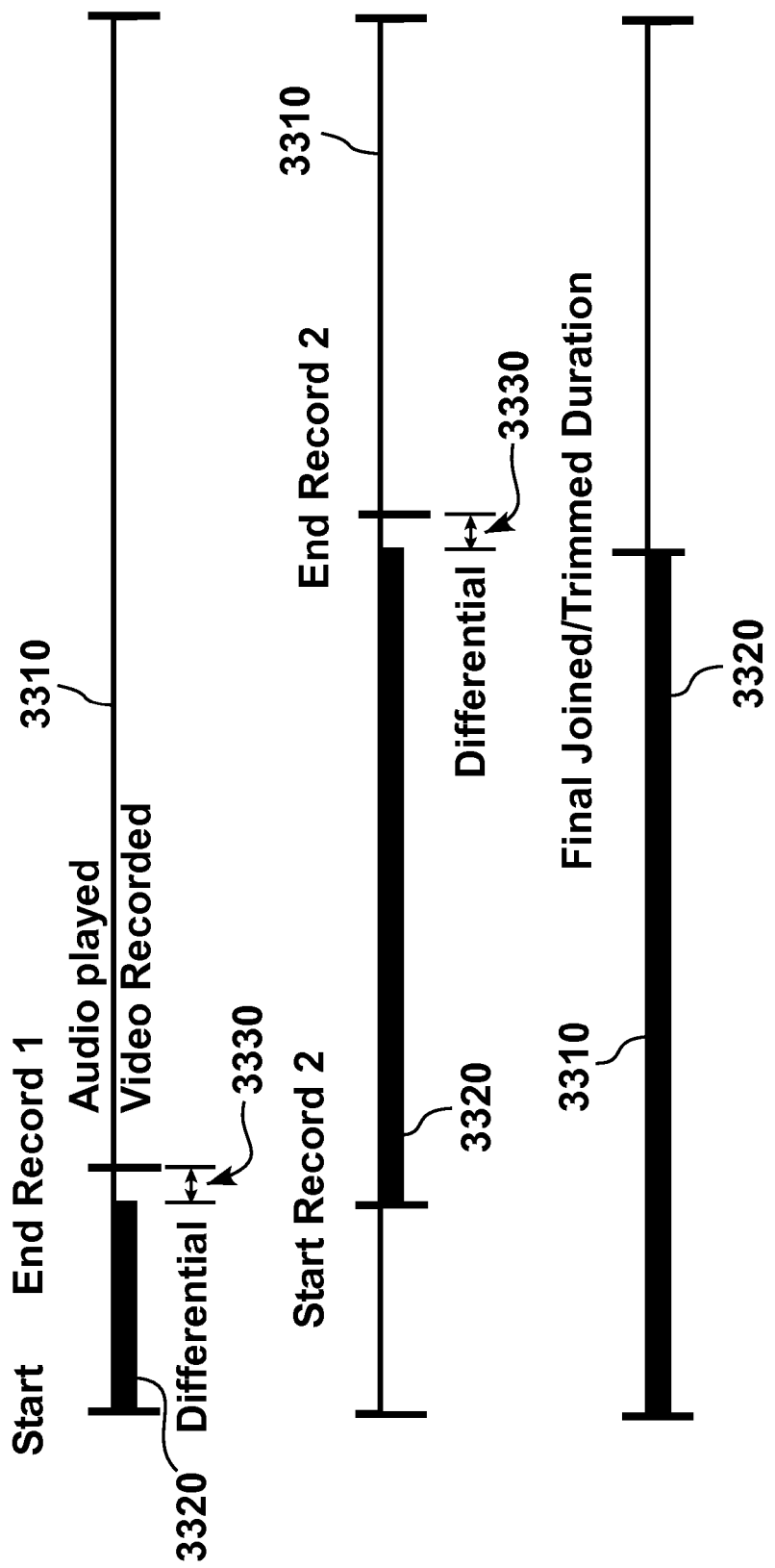
FIG. 33 depicts another process in accordance with some embodiments presently disclosed.

In some embodiment, due to hardware/software speeds of the device 100, the length of the video segment recorded between activation and deactivation of the record icon 510 does not match the amount of time the audio file 420 is played between activation and deactivation of the record icon 510. For example, the user places his finger on the record icon 510 and removes it after about 2.5 seconds. Although the audio file 420 plays about 2.5 seconds, due to the hardware/software speeds of the device 100, the actual length of the video segment that was recorded may be less than 2.5 seconds. To avoid syncing inconsistencies when the video recording is resumed, the audio file 420 according to one embodiment is rewound back to match the actual recorded length of video segment. In some embodiment, a process of adjusting position of soundtrack audio to account for lost frames on video recording is shown in FIG. 33. Referring to FIG. 33, length of audio file 420 that was played is represented by a thin line 3310; length of video that was recorded is represented by a thicker line 3320; the difference between the length of the audio file 420 played and the length of the video recorded is represented by length 3330. As shown in FIG. 33, the audio file 420 is backed up substantially equivalent to length 3330 every time it is determined that the length of the video recorded differs from the duration of the audio file 420 that was played.

In one embodiment, this process is repeated for every video segment being recorded upon the removal of the finger contact 565.

Figure 7:
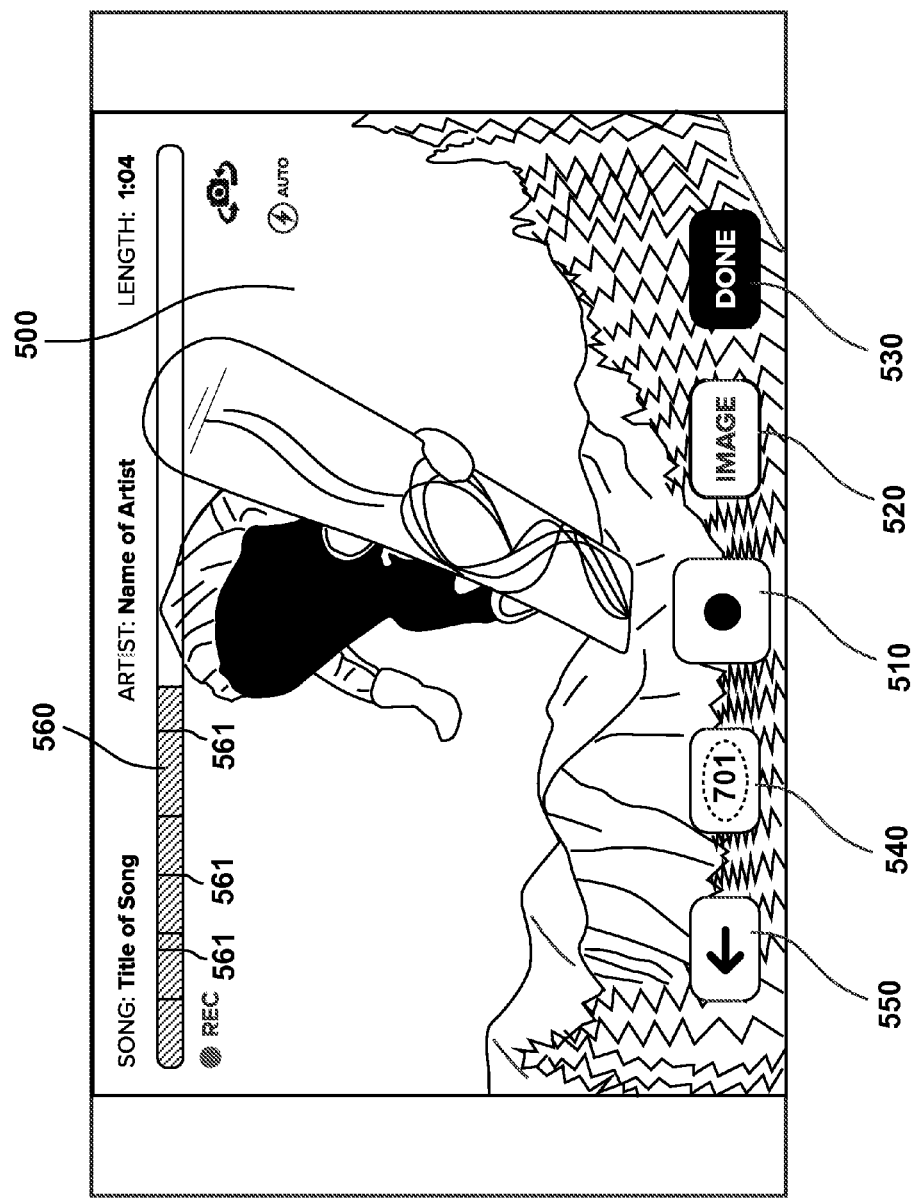

In some embodiments, if the undo icon 540 is activated by a finger contact 701 (as shown in FIG. 7), the device 100 deletes the last recorded video segment, adjusts setting to reflect change in audio time and total fragment duration. For example, if the video segment to be deleted was 11.3 seconds in length, to avoid syncing inconsistencies when the video recording is resumed, the audio file 420 according to one embodiment is rewound back 11.3 seconds (i.e. the length of the video segment to be deleted) when finger contact 701 activates the undo icon 540.

Figure 8:
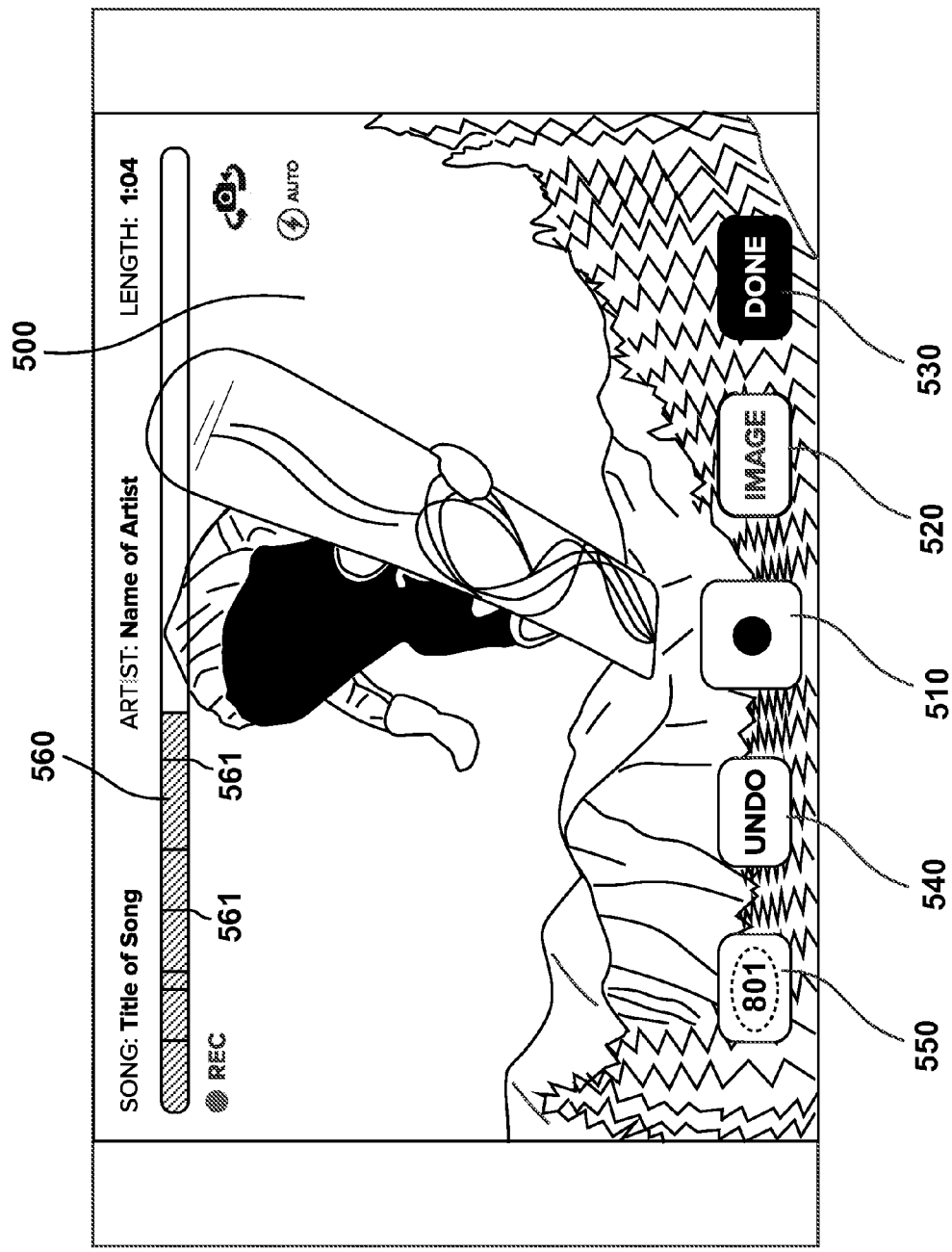

In some embodiments, if the return icon 550 is activated by a finger contact 801 (as shown in FIG. 8), the device 100 exits the video camera screen 500 and returns, for example, to the home screen 200 shown in FIGS. 2 and 3. In some embodiments, if the return icon 550 is activated by a finger contact 801 (as shown in FIG. 8), the device 100 exits the video camera screen 500 and returns, for example, to the music screen 440 shown in FIG. 4 to, for example, allow the user to select another audio file.

Figure 9:
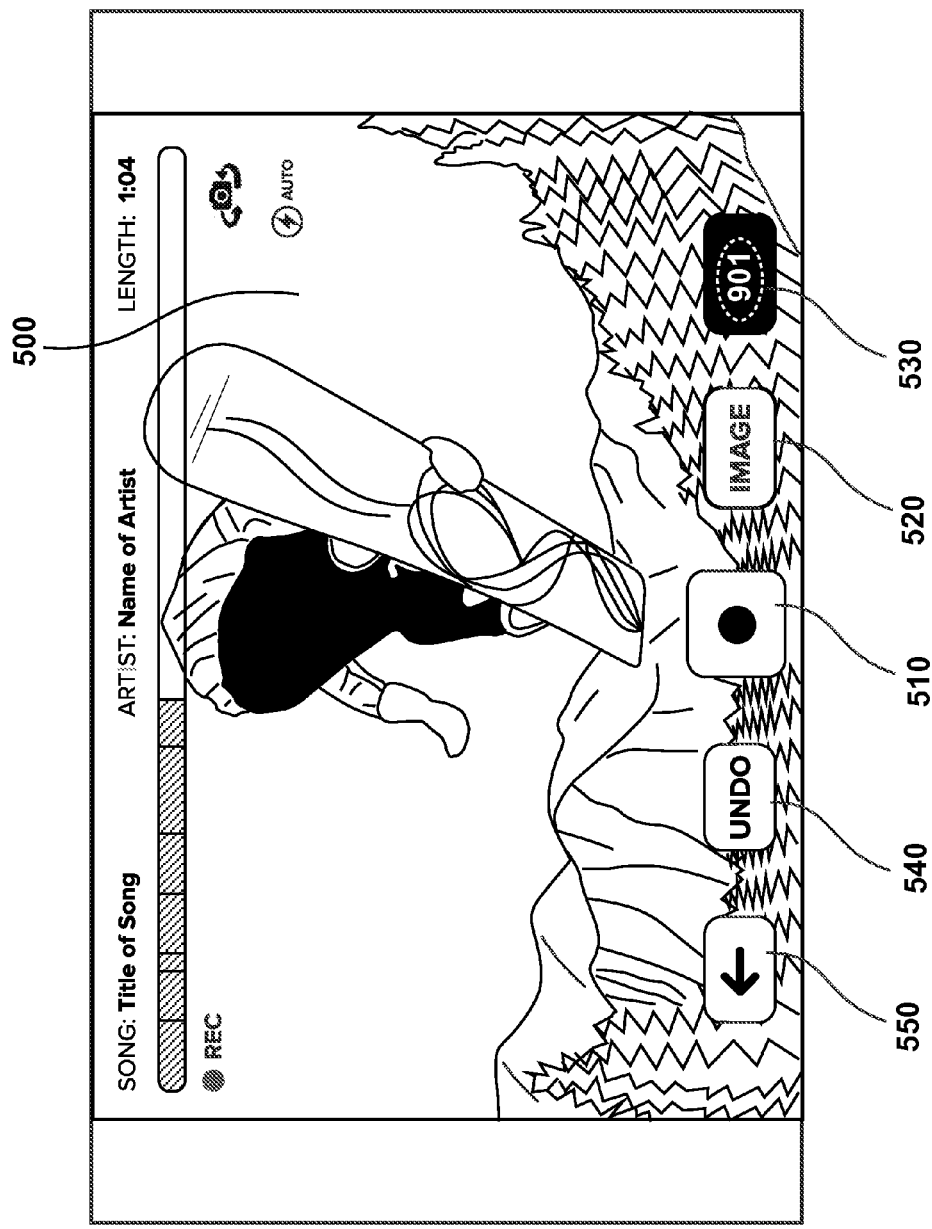
Figure 10:
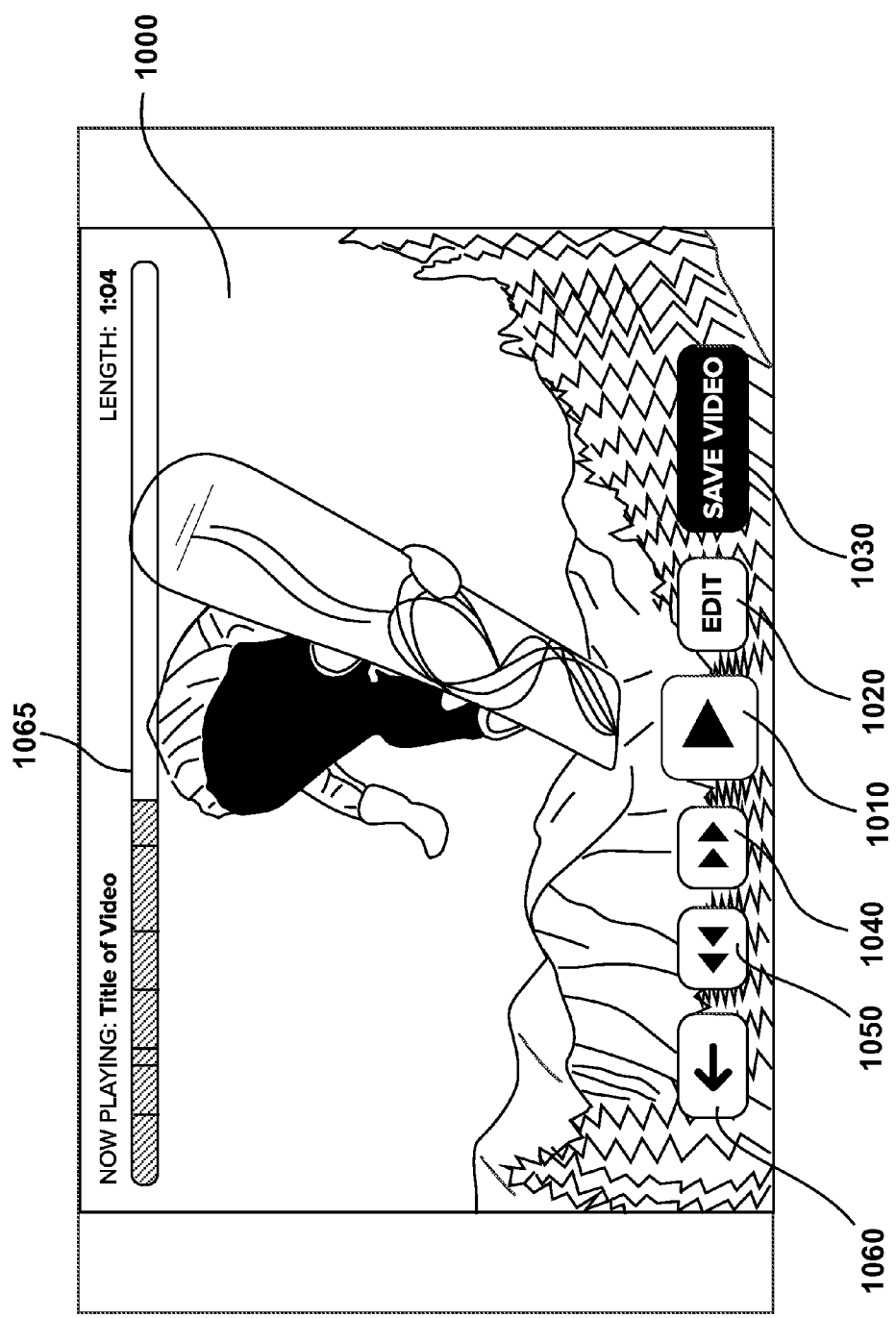
Figure 31:
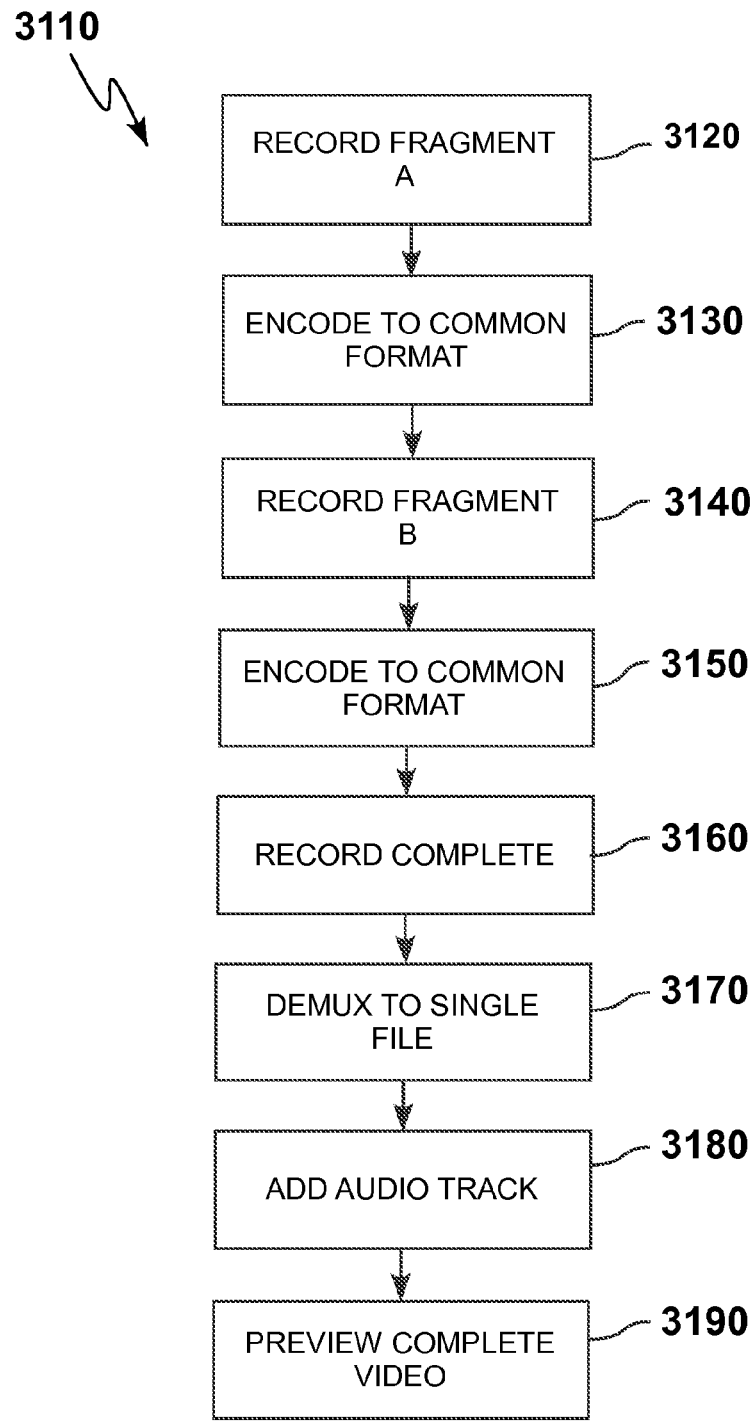
FIG. 31 depicts another process in accordance with some embodiments presently disclosed.

In some embodiments, if the done icon 530 is activated by a finger contact 901 (as shown in FIG. 9), the device 100 performs splicing and re-encoding process of all the video segments and their associated video files and displays a preview screen 1000 as shown in FIG. 10. In one embodiment, a flow diagram 3110 of the splicing and encoding process is shown in FIG. 31. Referring to FIG. 31, at 3120, video segment A is recorded; at 3130, the video segment A is encoded to common format and stored, for example, in the memory as described above; at 3140, video segment B is recorded; at 3150, the video segment B is encoded to common format and stored, for example, in the memory as described above; at 3160, the process 3110 determines that the done icon 530 is activated by the finger contact 901; at 3170, the encoded video segments A and B are demuxed to a single file; at 3180, the audio file 420 is added to the demuxed single file; at 3190, the process 3110 previews the complete video when play icon 1010 (shown in FIG. 10) is activated.

In some embodiments, the device 100 displays one or more preview controls associated with the preview screen 1000. In some embodiments, the one or more preview controls comprise a play/pause icon 1010, an edit icon 1020, a save video icon 1030, a fast forwards icon 1040, a rewind icon 1050, a return icon 1060, and/or a bar icon 1065 as shown in FIG. 10.

The play/pause icon 1010 allows the user to play and pause spliced video preview playback. The edict icon 1020 allows the user to return to the video camera screen 500 to continue modifying video by deleting one or more video segments with audio and/or record one or more new video segments with audio. The save video icon 1030 allows the user to store the spliced video in, for example, memory 102 for future playback and/or sharing with friends/family. The fast forward icon 1040 allows the user to seek forwards in time in spliced video preview playback. The rewind icon 1050 allows the user to seek backwards in time in spliced video preview playback. The return icon 1060 allows the user to go back to home screen 200 and/or music screen 440. The bar icon 1065 shows the progress of the spliced video preview playback.

Figure 11:
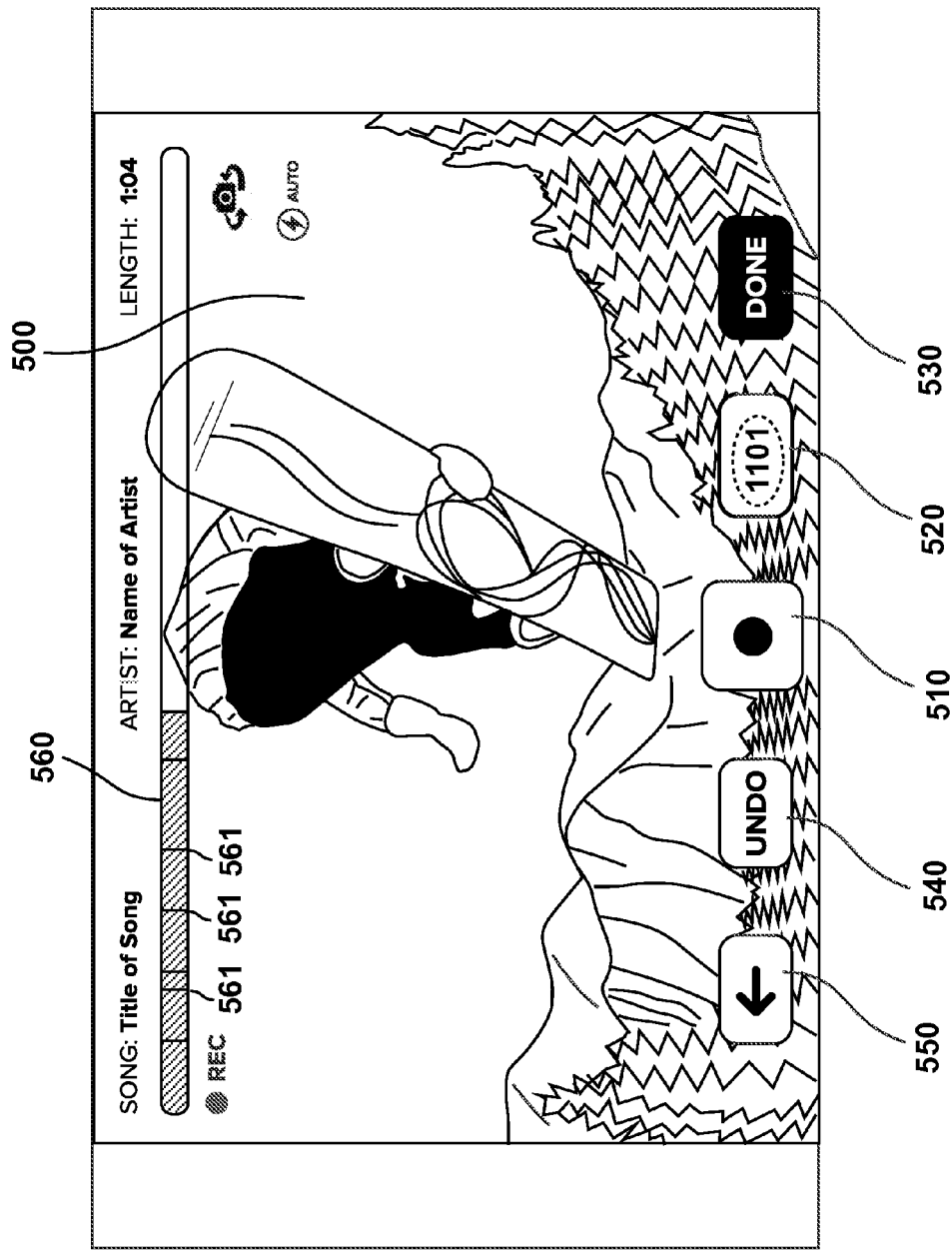
Figure 12:
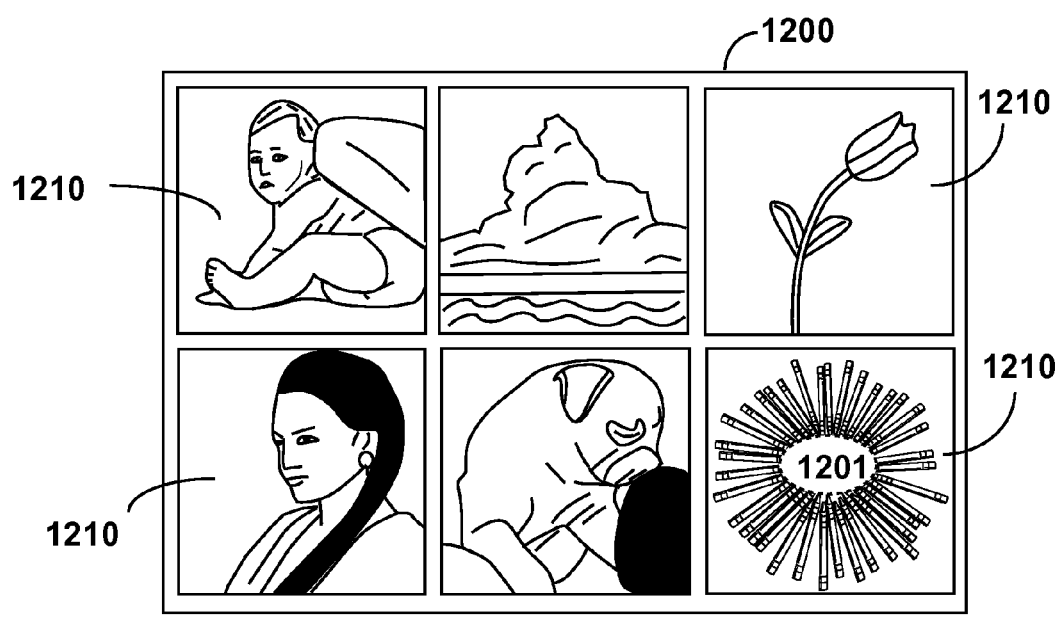
FIG. 12 depicts another user interface in accordance with some embodiments presently disclosed.
Figure 13:
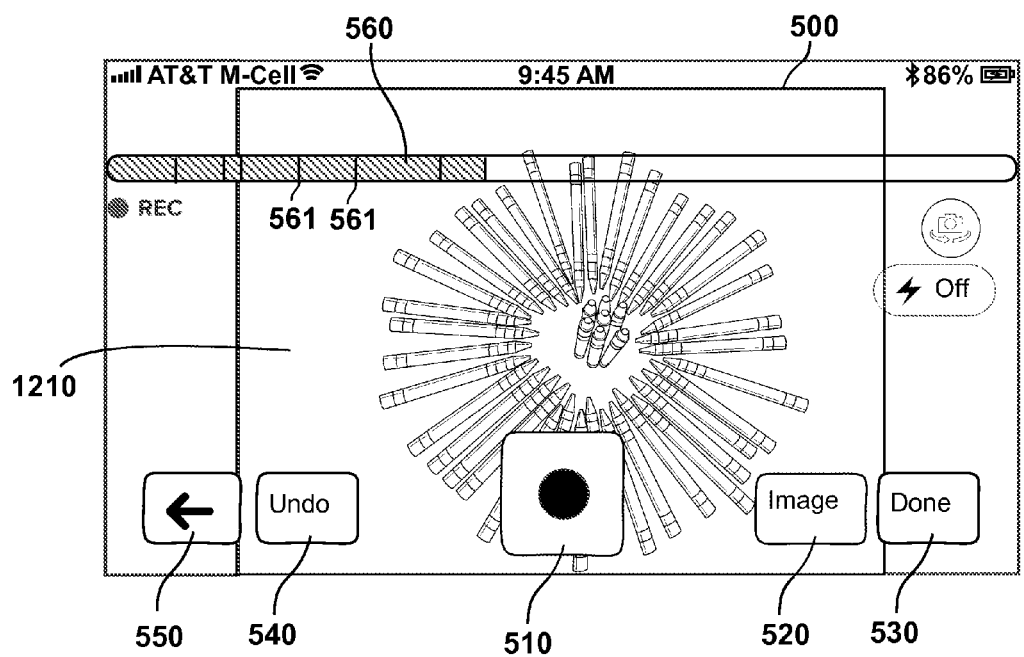
FIGS. 13-15 depict another user interface in accordance with some embodiments presently disclosed.

In some embodiments, if the image icon 520 is activated by a finger contact 1101 (as shown in FIG. 11), the device 100 exits the video camera screen 500 and enters an image selection screen 1200 (shown in FIG. 12) depicting one or more images 1210. In one embodiment, the images 1210 are stored, for example, in the memory 102 of the device 100. In another embodiment, the images 1210 are stored in a remote computer (not shown) and available for viewing on the device 100 and/or available for download to the device 100. If one of the images 1210 is selected with a finger contact 1201, the selected image 1210 is displayed in the video camera screen 500 as shown in FIG. 13.

Figure 14:
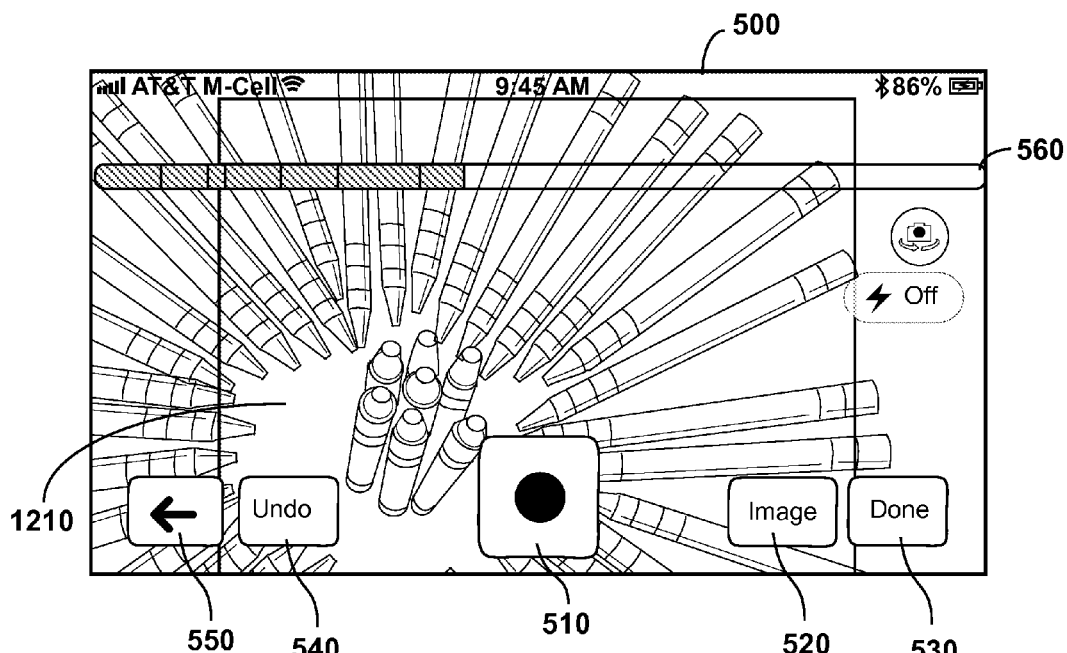

In some embodiments, the device 100 is configured to allow the user to zoom-in and/or drag the selected image 1210 in the video camera screen 500 (as shown in FIG. 14) to allow a portion of the selected image 1210 to be included in an image video segment.

Figure 15:
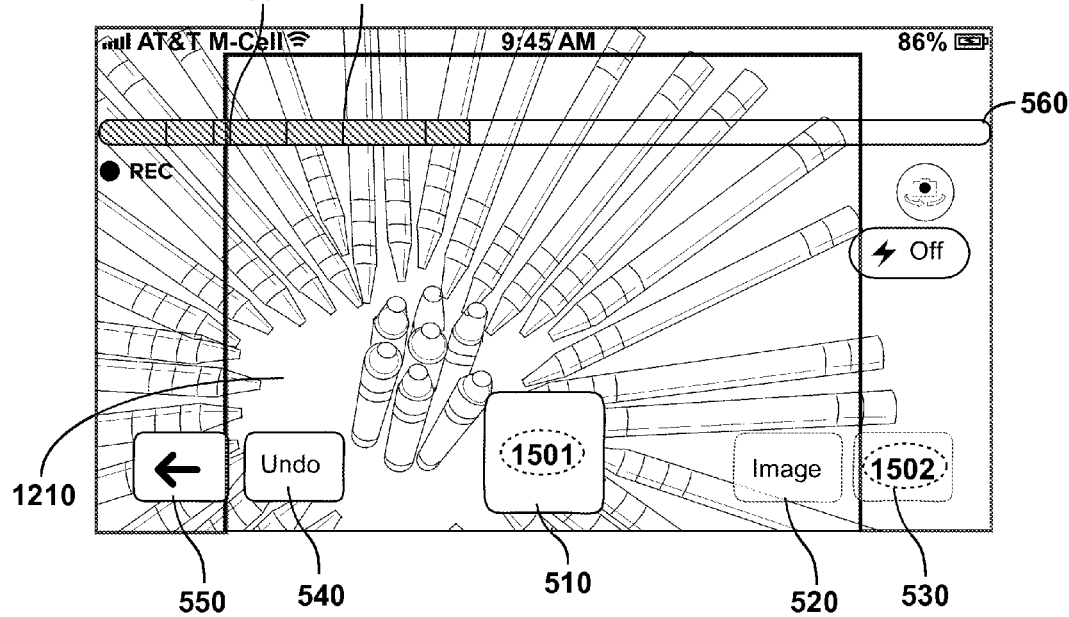

In some embodiment, if the record icon 510 is activated by a finger contact 1501 (as shown in FIG. 15), the device 100 initiates video recording of selected image 1210 and the device 100 initiates the playing of the audio file 420 through the speaker 111. In some embodiments, the device 100 continues video recording the selected image 1210 as long as the record icon 510 is being activated by the finger contact 1501. In some embodiments, the device 100 pauses video recording of the selected image 1210 as soon as the finger contact 1501 is removed from the record icon 510. In some embodiments, the user can record multiple image video segments of the selected image 1210 by starting and pausing video recording multiple times by applying and removing finger contact 1501 to and from the record icon 510. In some embodiments, the device 100 plays the audio file 420 through the speaker 111 only while the record icon 510 is being activated by the finger contact 1501. In some embodiments, video recording and playing of the audio file 420 is started and paused by applying finger contact 1501 to and from the record icon 510. In some embodiments, the progress of video recording is shown in the progress bar icon 560. In some embodiments, presently disclosed camera application generates one or more markers 1561 in the progress bar icon 560 every time the user pauses video recording by removing finger contact 1501. In some embodiments, each marker 1561 represents an end of an image video segment preceding it.

Figure 30:
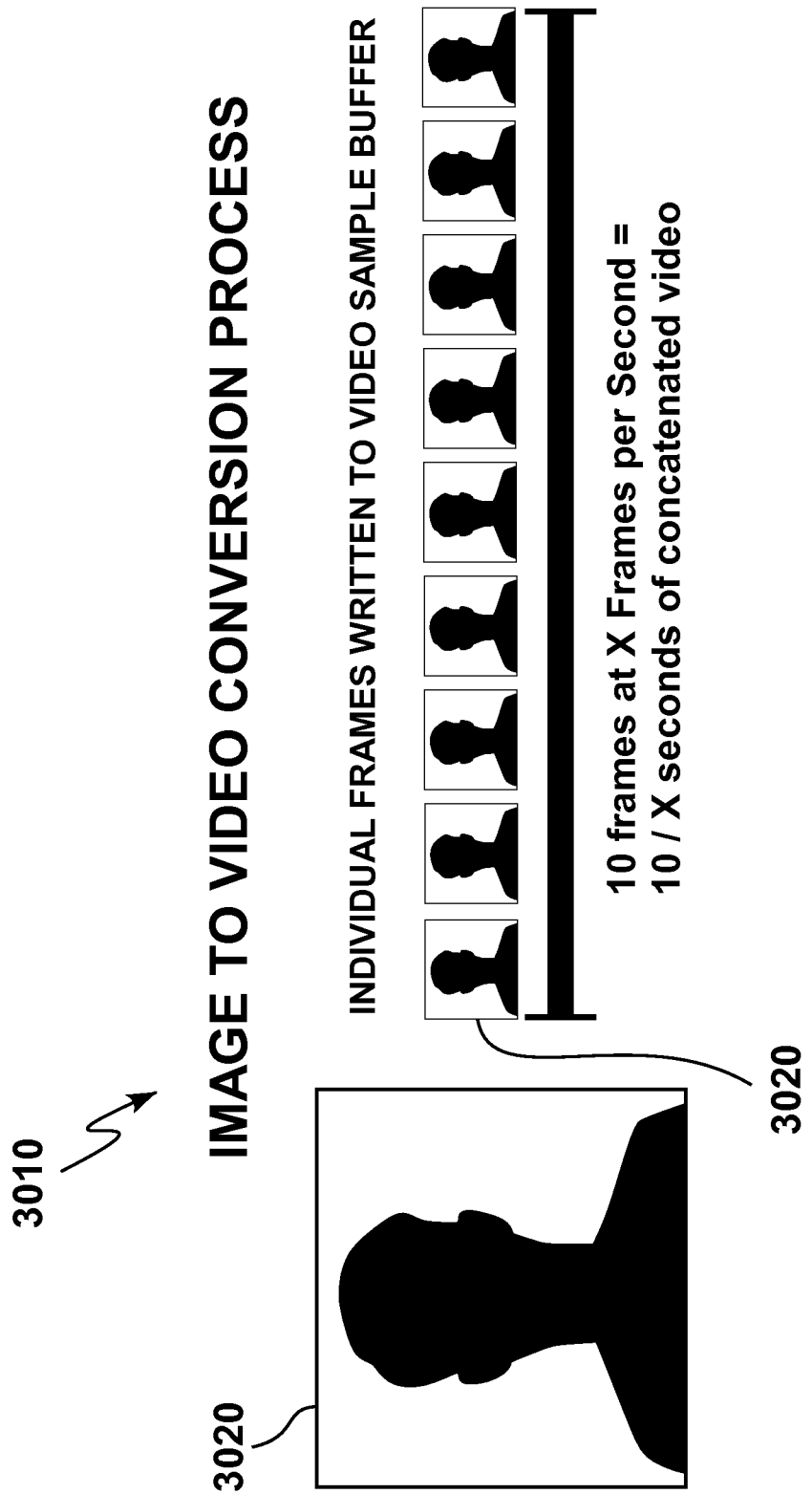
FIG. 30 depicts another process in accordance with some embodiments presently disclosed.

In some embodiments, the device 100 repeats the selected image 1210 in video record frame buffer(s) (not shown) as long as the record icon 510 is being activated by the finger contact 1501. In some embodiments, frames in the video record frame buffer are processed into a single image video segment as soon as the finger contact 1501 is removed from the record icon 510. In one embodiment, an image to video conversion process 3010 is shown in FIG. 30. Referring to FIG. 30, individual frames 3020 are written to individual frames in a video where the length of the video is substantially equivalent to the length of time the record icon 510 is being activated by the finger contact 1501.

In some embodiments, each image video segment recorded by the user is stored in, for example, memory 102 as a separate image video file (not shown). In some embodiments, upon re-activation of the record icon 510, the device 100 will resume the playback of the audio file 420 from the same place it was paused when the record icon 510 was deactivated by the removal of the finger contact 1501.

In some embodiment, due to hardware/software speeds of the device 100, the length of the image video segment recorded between activation and deactivation of the record icon 510 does not match the amount of time the audio file 420 is played between activation and deactivation of the record icon 510. For example, the user places his finger on the record icon 510 and removes it after about 3.9 seconds. Although the audio file 420 plays about 3.9 seconds, due to the hardware/software speeds of the device 100, the actual length of the video segment that was recorded may be less than 3.9 seconds. To avoid syncing inconsistencies when the video recording is resumed, the audio file 420 according to one embodiment is rewound back to match the actual recorded length of video segment.

In one embodiment, this process is repeated for every image video segment being recorded upon the removal of the finger contact 565.

Figure 16:
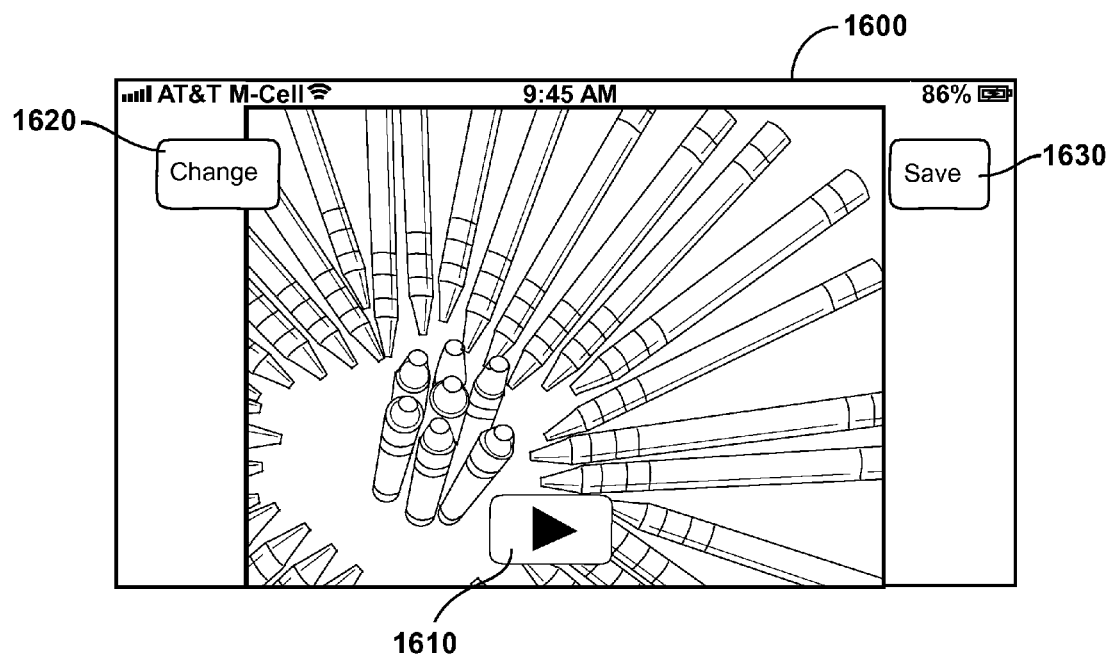
FIG. 16 depicts another user interface in accordance with some embodiments presently disclosed.
Figure 32:
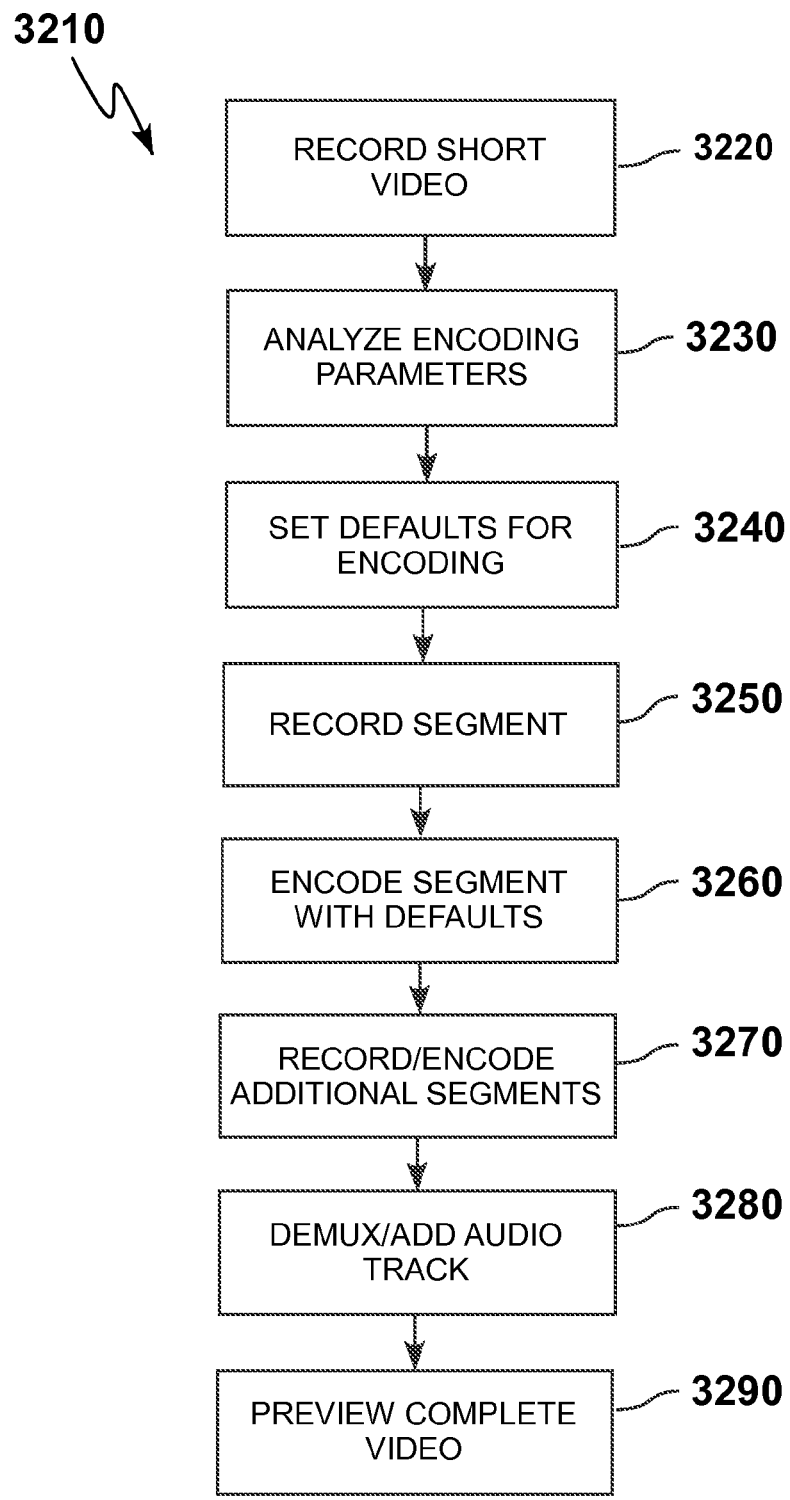
FIG. 32 depicts another process in accordance with some embodiments presently disclosed.

In some embodiments, if the done icon 530 is activated by a finger contact 1502 (as shown in FIG. 15), the device 100 performs splicing and re-encoding process of all the image video segments and their associated image video files and displays a preview screen 1600 as shown in FIG. 16. In one embodiment, a process 3210 for splicing and re-encoding of plurality image video segments is shown in FIG. 32. Referring to FIG. 32, at 3220, a video segments is recorded; at 3230, encoding parameters of the recorded video segment are analyzed; at 3240, defaults are set for the encoded parameters; at 3250, another segment is recorded; at 3260, the another recorded segement is encoded with defaults; at 3270, additional segments are recorded and encoded; at 3280, audio track is added and the video is demuxed; at 3290, the video is ready for preview.

Referring to FIG. 16, in some embodiments, the device 100 displays one or more preview controls associated with the preview screen 1600. In some embodiments, the one or more preview controls comprise a play/pause icon 1610, a save icon 1630, and/or change icon 1620 as shown in FIG. 16.

The play/pause icon 1610 allows the user to play and pause spliced video preview playback. The change icon 1620 allows the user to return to the video camera screen 500 to continue modifying video by deleting one or more image video segments with audio and/or record one or more new image video segments with audio. The save video icon 1630 allows the user to store the spliced video in, for example, memory 102 for future playback and/or sharing with friends/family.

FIGS. 17-27 illustrate additional user interfaces for a camera application that may be implemented, for example, in the device 100 or other electronic devices in accordance with some embodiments presently disclosed. In some embodiments presently disclosed, a computer-implemented method is performed at an electronic device (e.g., 100) with a touch screen display 112.

Figure 17:
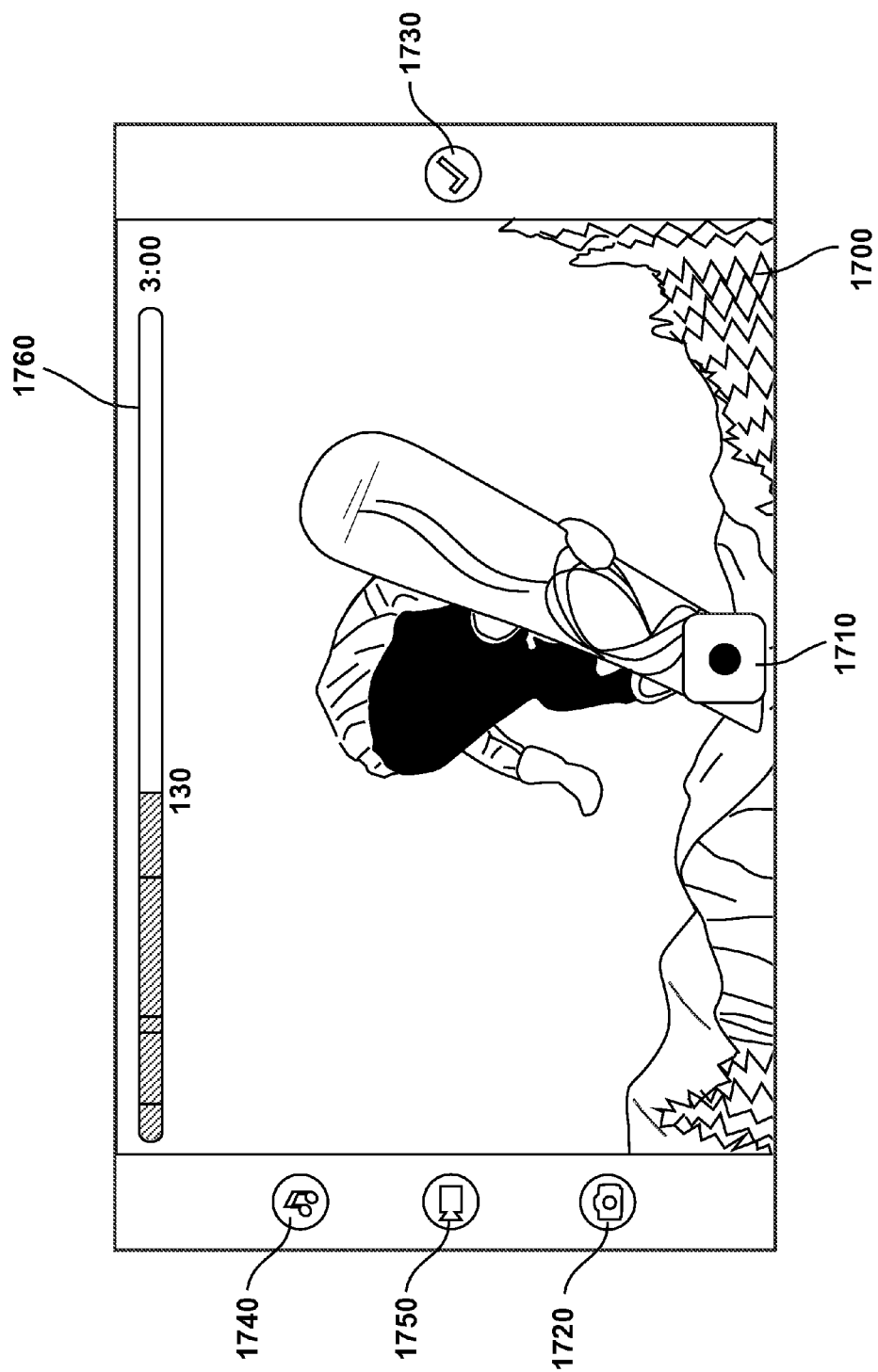
FIGS. 17-20 depict another user interface in accordance with some embodiments presently disclosed.
Figure 18:
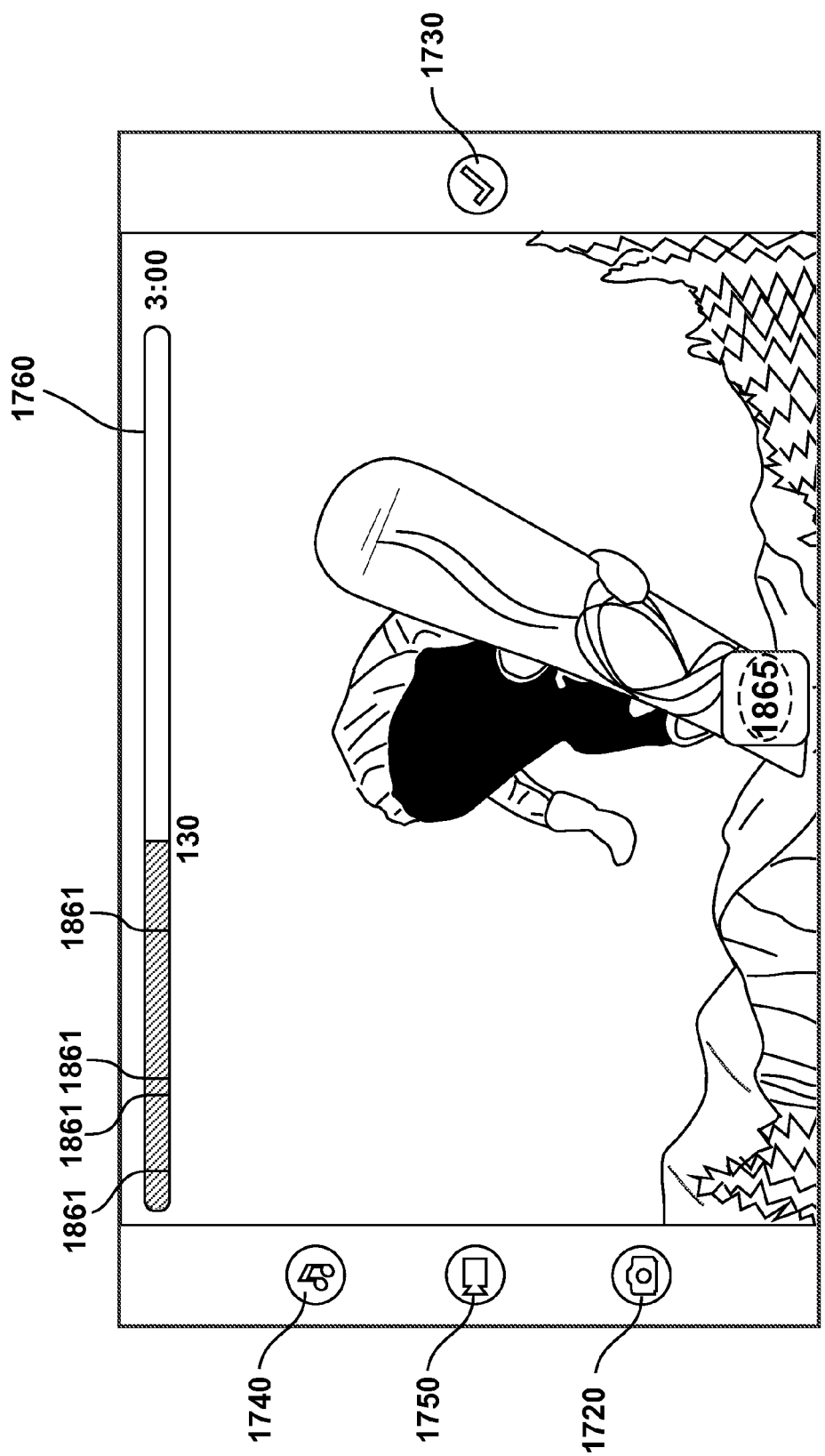
Figure 19:
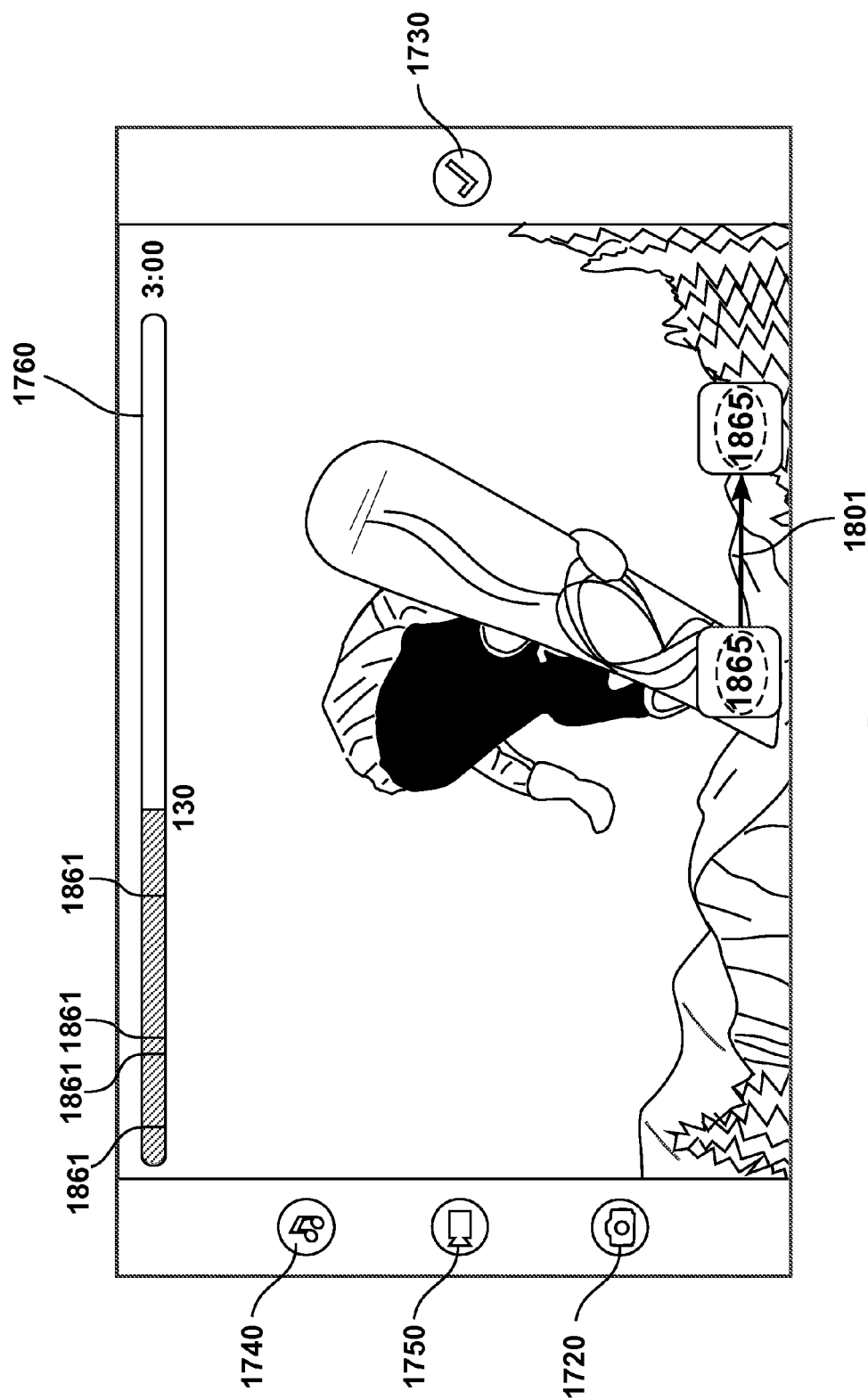

In some embodiments, in response to a series of gestures (e.g. finger taps) by the user, the device 100 displays a video camera screen 1700 on the touch screen display 112 (as shown in FIG. 17). In this embodiment, the video camera screen 1700 displays on the touch screen display 112 images of objects/people positioned in front of the optical sensor 164. In one embodiment, the video camera screen 1700 is displayed in the portrait view (not shown) or a landscape view (as shown in FIG. 17).

In some embodiments, the device 100 displays one or more record controls associated with the video camera screen 1700. In some embodiments, the one or more record controls comprise a record icon 1710, an image icon 1720, a done icon 1730, a music icon 1740, a video icon 1750, and/or a progress bar icon 1760 as shown in FIG. 17. In some embodiments, displaying one or more record controls comprises displaying one or more record controls on top of the video camera screen 1700 (not shown). In some embodiments, displaying one or more record controls comprises displaying one or more record controls on bottom of the video camera screen 1700 (shown in FIG. 17). In some embodiments, displaying one or more record controls comprises displaying one or more record controls on one or more sides of the video camera screen 1700 (as shown in FIG. 17).

In some embodiments, while recording one or more images, the device 100 ceases to display the one or more playback controls. In some embodiments, ceasing to display the one or more playback controls comprises fading out the one or more playback controls. In some embodiments, the display of the one or more playback controls is ceased after a predetermined time. In some embodiments, the display of the one or more playback controls is ceased after no contact is detected with the touch screen display for a predetermined time.

In some embodiments, if the record icon 1710 is activated by a finger contact 1865 (shown in FIG. 18), the device 100 initiates video recording of objects/people positioned in front of the optical sensor 164 and the device 100 initiates the playing of the audio file 420 (as described above) through the speaker 111. In some embodiments, the device 100 continues video recording as long as the record icon 1710 is being activated by the finger contact 1865. In some embodiments, the device 100 pauses video recording as soon as the finger contact 1865 is removed from the record icon 1710. In some embodiments, the user can record multiple video segments by starting and pausing video recording multiple times by applying and removing finger contact 1865 to and from the record icon 1710. In some embodiments, the device 100 plays the audio file 420 through the speaker 111 only while the record icon 1710 is being activated by the finger contact 1865. In some embodiments, video recording and playing of the audio file 420 is started and paused by applying finger contact 1865 to and from the record icon 1710. In some embodiments, the progress of video recording is shown in the progress bar icon 1760. In some embodiments, presently disclosed camera application generates one or more markers 1861 in the progress bar icon 1760 every time the user pauses video recording by removing finger contact 1865. In some embodiments, each marker 1861 represents an end of a video segment(s) preceding it. In one embodiment, each video segment recorded by the user is stored in, for example, memory 102 as a separate video file (not shown).

In one embodiment, upon re-activation of the record icon 1710, the device 100 will resume the playback of the audio file 420 from the same place it was paused when the record icon 1710 was deactivated by the removal of the finger contact 1865.

In some embodiments, the user may continue video recording without having to continuously apply finger contact 1865 to the icon 1710. By applying finger contact 1865 and dragging his finger to another position on the video camera screen 1700 as shown, for example, by arrow 1801 in FIG. 19, the device 100 will continue recording even if the user removes his finger from the icon 1710. Dragging the finger contact 1865 to another location on the screen 1700 locks the record icon 1710 in the video recording position to allow the user to use his hands for other tasks. Dragging the finger contact 1865 from the locked video recording position back to the original location pauses the video recording. It is to be understood that the finger contact 1865 may be dragged up, left, right or down to lock the record icon 1710 in the video recording position.

In some embodiment, due to hardware/software speeds of the device 100, the length of the video segment recorded between activation and deactivation of the record icon 1710 does not match the amount of time the audio file 420 is played between activation and deactivation of the record icon 1710. For example, the user places his finger on the record icon 1710 and removes it after about 2.5 seconds. Although the audio file 420 plays about 2.5 seconds, due to the hardware/software speeds of the device 100, the actual length of the video segment that was recorded may be less than 2.5 seconds. To avoid syncing inconsistencies when the video recording is resumed, the audio file 420 according to one embodiment is rewound back to match the actual recorded length of video segment. In one embodiment, this process is repeated for every video segment being recorded upon the removal of the finger contact 1865.

Figure 20:
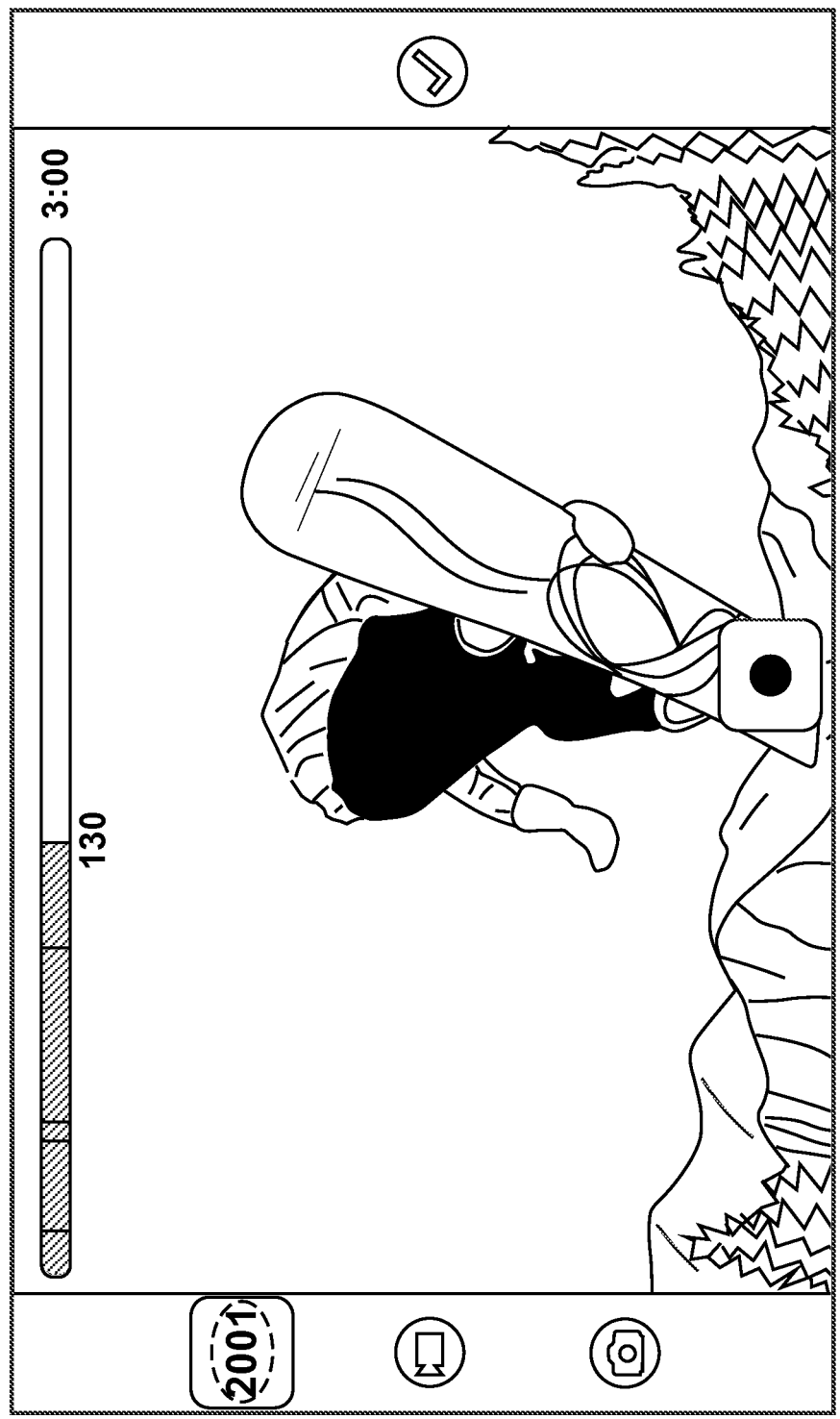
Figure 21:
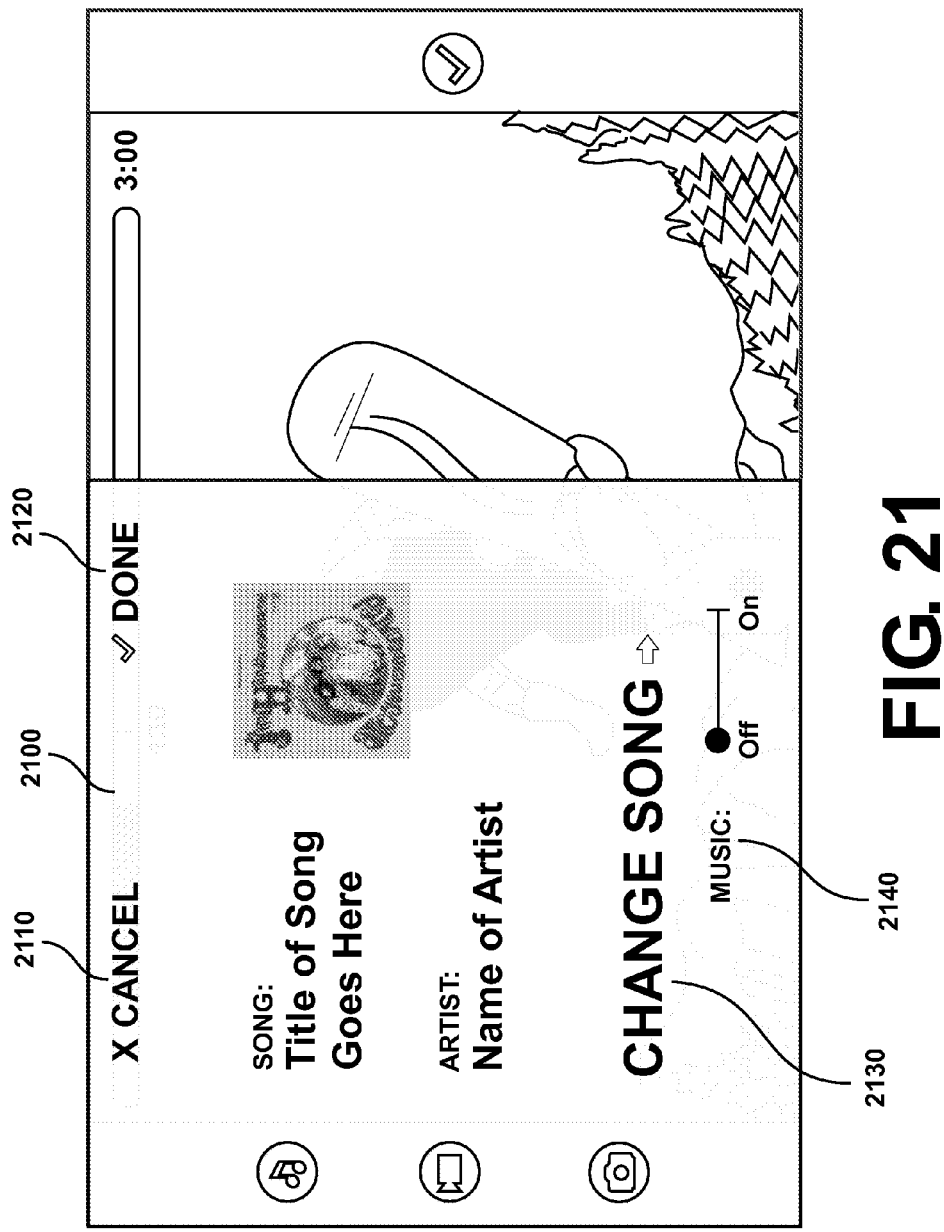
FIG. 21 depicts another user interface in accordance with some embodiments presently disclosed.

In some embodiments, if the music icon 1740 is activated by a finger contact 2001 (as shown in FIG. 20), the device 100 presents the user with a music option screen 2100 as shown in FIG. 21. In some embodiments, the music option screen 2100 presents the user with the information pertaining to the audio file 420 being played when record icon 1710 is activated by the finger contact 1865. In one embodiment, the music option screen 2100 presents the user with the name of the audio file 420, length of the audio file 420, and/or name of the artist/group performing the audio file 420.

In some embodiments, the device 100 displays one or more controls associated with the music option screen 2100. In some embodiments, the one or more controls comprise a cancel icon 2110, a done icon 2120, a change song icon 2130, and/or music switch 2140 as shown in FIG. 21.

In one embodiment, if the cancel icon 2110 is selected, the device 100 returns the user back to the video camera screen 1700 without any changes. In one embodiment, if the change song icon 2130 is selected, the device 100 exits the music option screen 2100 and returns to the music screen 440 (shown in FIG. 4) to allow the user to select another audio file to be played during recording. In one embodiment, if the music switch 2140 is toggled, the device 100 toggles the playback of an audio file during video recording. Toggling the music switch 2140 to an ON position allows the playback of an audio file during the video recording. Toggling the music switch 2140 to an OFF position deactivates the playback of an audio file during a video recording. In one embodiment, if the done icon 2120 is selected, the device 100 saves all the changes and returns the user back to the video camera screen 1700.

Figure 22:
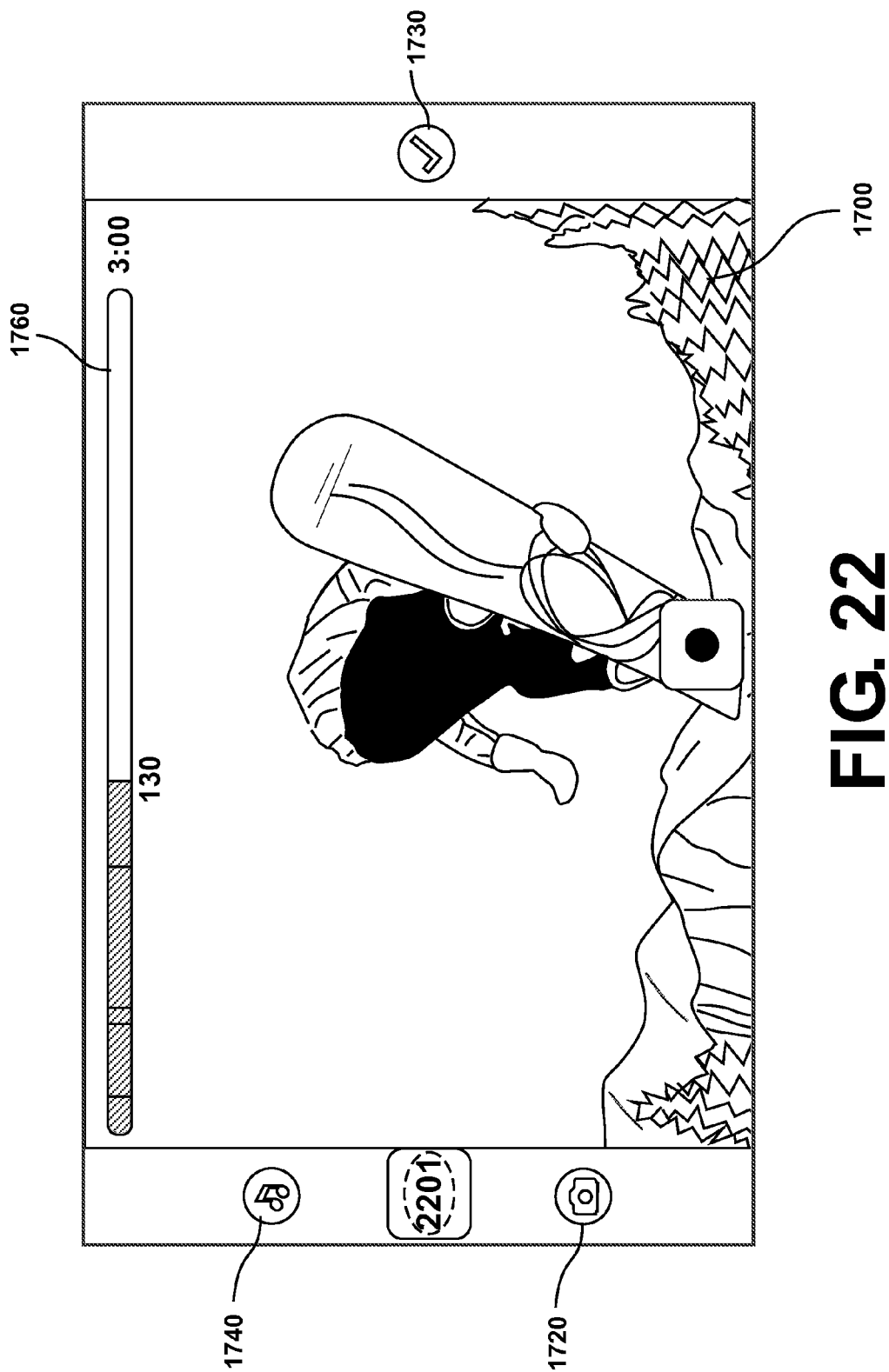
FIG. 22 depicts the user interface shown in FIG. 17.
Figure 23:
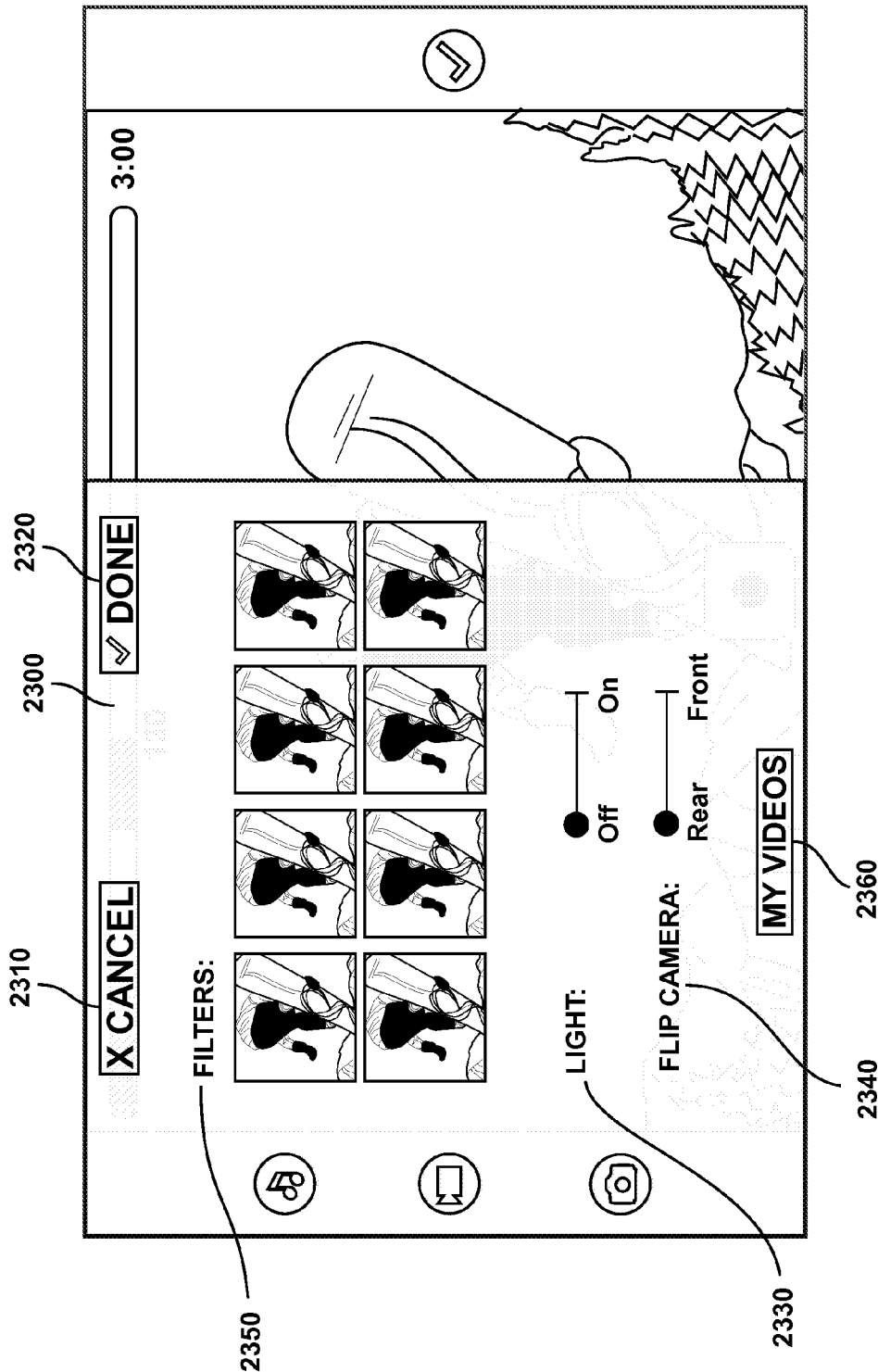
FIG. 23 depicts another user interface in accordance with some embodiments presently disclosed.

In some embodiments, if the video icon 1750 is activated by a finger contact 2201 (as shown in FIG. 22), the device 100 presents the user with a video option screen 2300 as shown in FIG. 23. In some embodiments, the device 100 displays one or more controls associated with the video option screen 2300. In some embodiments, the one or more controls comprise a cancel icon 2310, a done icon 2320, a light switch 2330, a camera switch 2340, a filter options 2350 and/or my videos icon 2360, as shown in FIG. 23.

In one embodiment, if the cancel icon 2310 is selected, the device 100 returns the user back to the video camera screen 1700 without any changes. In one embodiment, if the light switch 2330 is toggled, the device 100 toggles a flashlight (not shown) associated with the optical sensor 164. Toggling the light switch 2330 to an ON position activates the flashlight (no shown). Toggling the light switch 2330 to an OFF position deactivates the flashlight (no shown). In one embodiment, if the camera switch 2340 is toggled, the device 100 toggles which optical sensor 164 is used to video record. Toggling the camera switch 2340 to a front position activates the optical sensor 164 located on the front of the device 100. Toggling the light switch 2330 to a rear position activates the optical sensor 164 located on the back of the device 100. In one embodiment, the filter options 2350 allow the user to select different filters for their video recordings. In some embodiments, the filters include overlays such as, for example, film grain and/or light flares. In some embodiments, the filters include color adjustments such as, for example, grayscale, sepia, color splash, and/or cartoon. In some embodiments, the filters include pixel distortion effects such as, for example, fish eye. In some embodiments, the filters include combination filters such as, for example, film grain on grayscale. In one embodiment, if the done icon 2320 is selected, the device 100 saves all the changes and returns the user back to the video camera screen 1700.

In one embodiment, if the my videos icon 2360 is selected, the device 100 exits the video option screen 2300 and returns to the my videos screen 200 (shown in FIG. 2) to allow the user to import a previously recorded video file as new video segment in another video.

Figure 24:
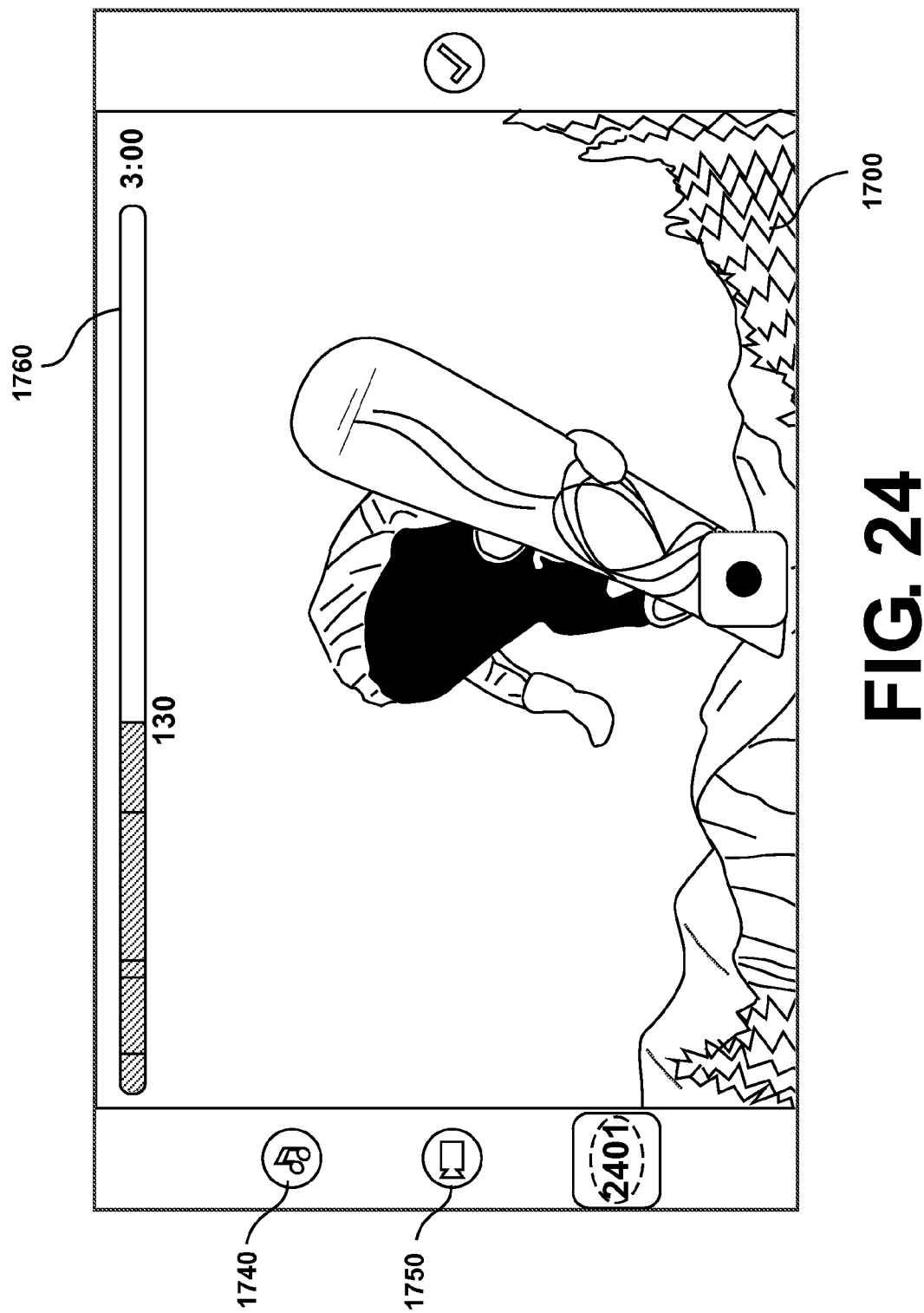
FIG. 24 depicts the user interface shown in FIG. 17.
Figure 25:
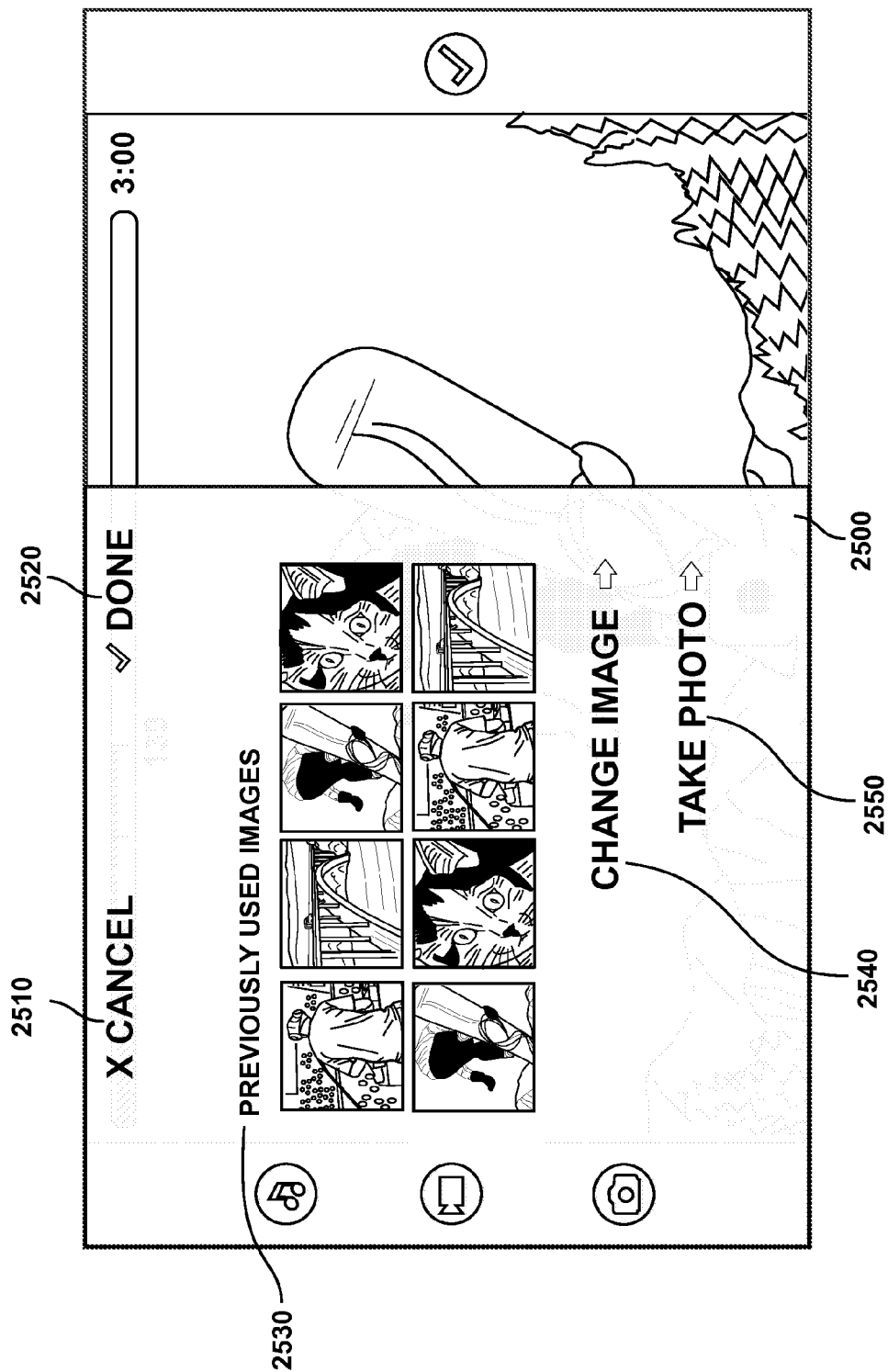
FIG. 25 depicts another user interface in accordance with some embodiments presently disclosed.

In some embodiments, if the image icon 1720 is activated by a finger contact 2401 (as shown in FIG. 24), the device 100 presents the user with an image option screen 2500 as shown in FIG. 25. In some embodiments, the device 100 displays one or more controls associated with the image option screen 2500. In some embodiments, the one or more controls comprise a cancel icon 2510, a done icon 2520, a previously used images icons 2530, a change image icon 2530 and/or take a new photo icon 2550, as shown in FIG. 25.

In one embodiment, if the cancel icon 2510 is selected, the device 100 returns the user back to the video camera screen 1700 without any changes. In one embodiment, under the previously used images icons 2530, the user is presented with a plurality of images that were previously used during other video recording(s). In one embodiment, if the change image icon 2540 is selected, the device 100 exits the image option screen 2500 and returns to the image selection screen 1200 (shown in FIG. 12) to allow the user to select another image to be displayed during recording. In one embodiment, if the new photo icon 2550 is selected, the device 100 exits the image option screen 2500 and allows the user to take a new photograph to be used during recording. In one embodiment, if the done icon 2320 is selected, the device 100 saves all the changes and returns the user back to the video camera screen 1700.

Figure 26:
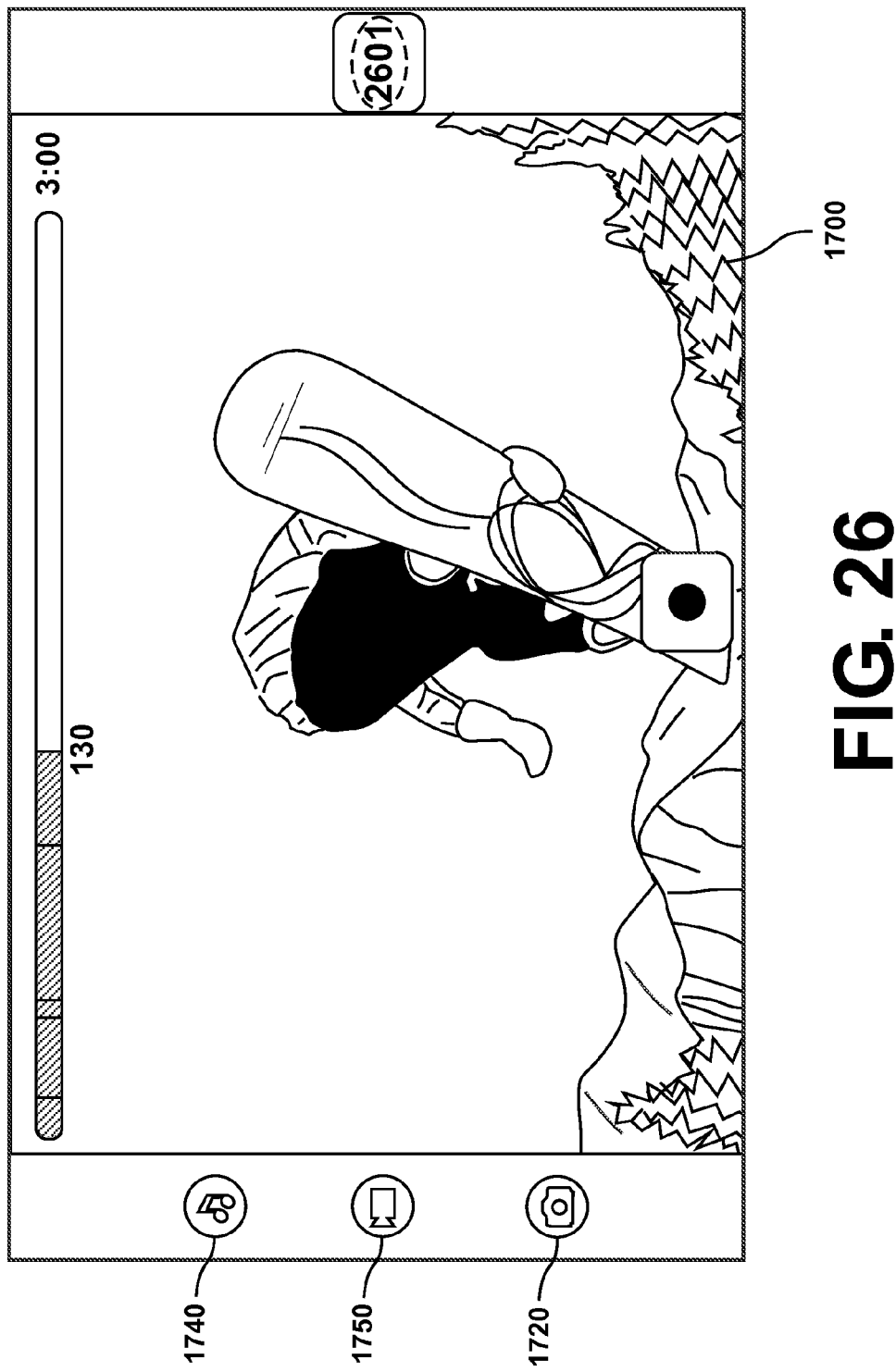
FIG. 26 depicts the user interface shown in FIG. 17.
Figure 27:
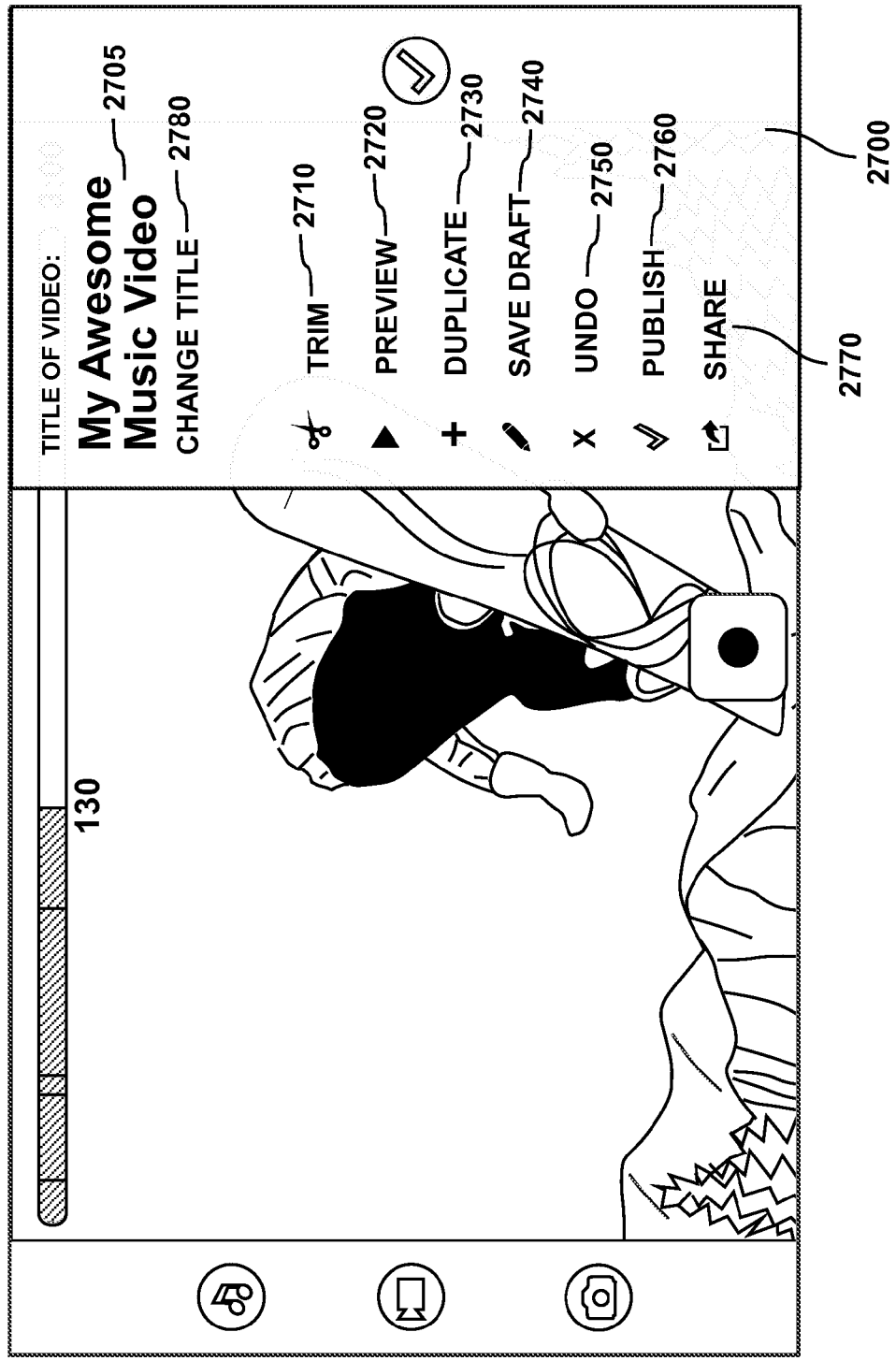
FIG. 27 depicts another user interface in accordance with some embodiments presently disclosed.

In some embodiments, if the done icon 1730 is activated by a finger contact 2601 (as shown in FIG. 26), the device 100 presents the user with an option screen 2700 as shown in FIG. 27. In some embodiments, the option screen 2700 presents the user with the title 2705 of the video being recorded.

In some embodiments, the device 100 displays one or more controls associated with the option screen 2700. In some embodiments, the one or more controls comprise a trim icon 2710, a preview icon 2720, a duplicate icon 2730, a save draft icon 2740, and undo icon 2750, a publish icon 2760, a change title icon 2780 and/or a share icon 2770, as shown in FIG. 27.

In one embodiment, if the trim icon 2710 is selected, the device 100 allows the user to select a specific range of video to keep and discard the rest. This may be used, for example, in importing external video to select a given length to work with. Once trimmed, it is used like any other video file.

In one embodiment, if the preview icon 2720 is selected, the device 100 exits the option screen 2700 and enters the preview screen 1000 shown in and described with reference to FIG. 10.

In one embodiment, if the duplicate icon 2730 is selected, the device 100 creates a completely separate copy of the data so that the user can continue on the current project and branch to a separate project with same data at a later time.

In one embodiment, if the save draft icon 2740 is selected, the device 100 takes the currently recorded segments and copies them in a bundle (files and relevant position and metadata) for use later. This allows users to resume working on this draft video at a later time.

In one embodiment, if the undo icon 2750 is selected, the device 100 deletes the last segment recorded and its relevant data.

In one embodiment, if the publish icon 2760 is selected, the device 100 performs a concatenation process and converts all segments/audio in to a single video file.

In one embodiment, if the share icon 2770 is selected, the device 100 allows the user to share their video with other people using, for example, YouTube, email, Instagram, etc.

In one embodiment, if the change title icon 2780 is selected, the device 100 allows the user that change the title of the video.

Figure 28:
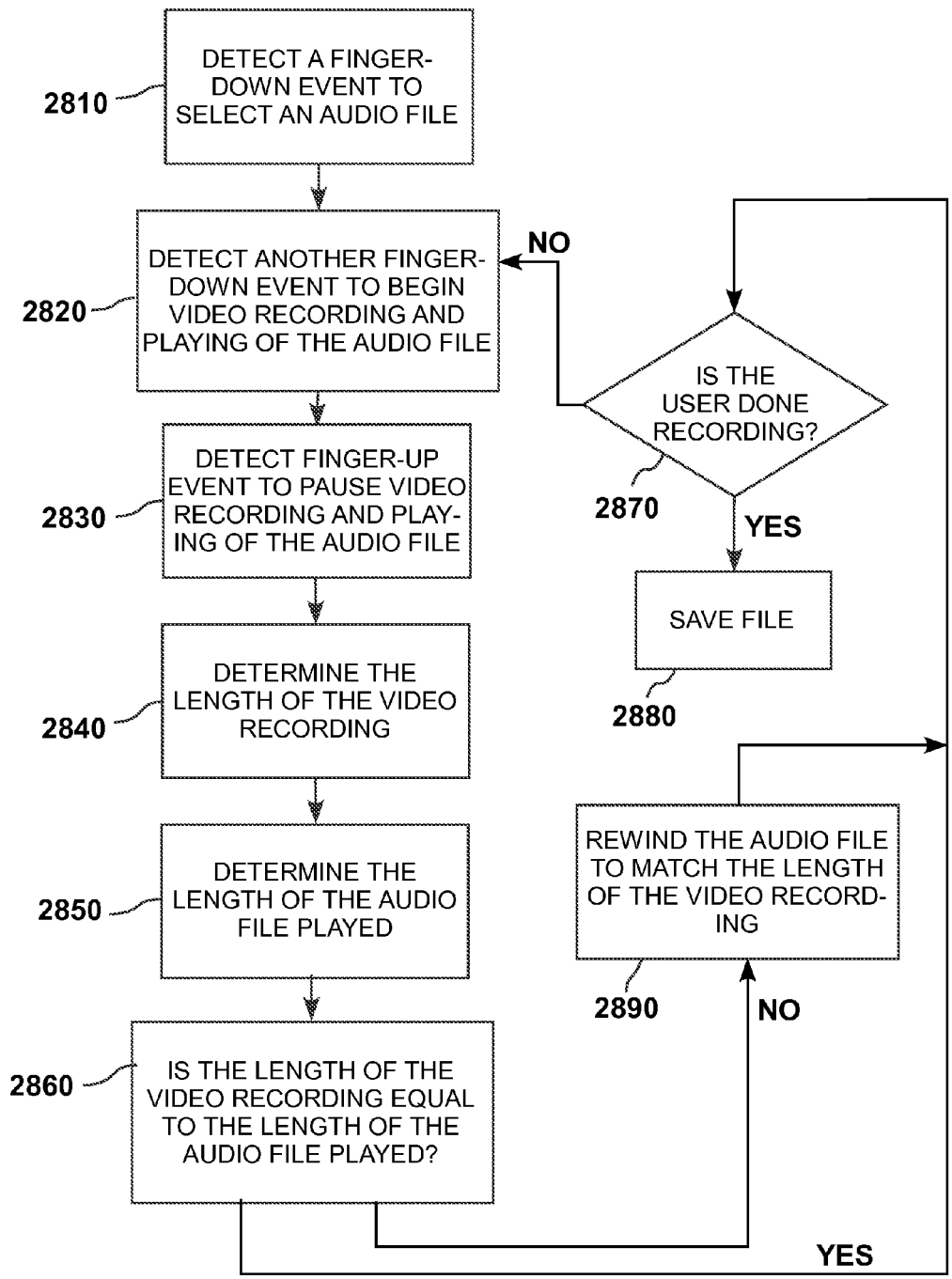
FIG. 28 depicts a process in accordance with some embodiments presently disclosed.

FIG. 28 depicts a flow diagram showing a process of recording a video in accordance with some embodiments. Referring to FIG. 28, in some embodiments, at 2810, a device detects a finger-down event (i.e. finger contact with the touch screen 112) to select an audio file. At 2820, the device detects another finger-down event to begin video recording and playing of the audio file. At 2830, the device detects a finger-up event to pause video recording and playing of the audio file. At 2840, the device determines the length of the video recording. At 2850, the device determines the length of the audio file played. At 2860, the device compares the length of the video recording with the length of the audio file played. At 2890, the device rewinds the audio file to match the length of the video recording if the length of the audio file is less than the length of the video recording.

Figure 29:
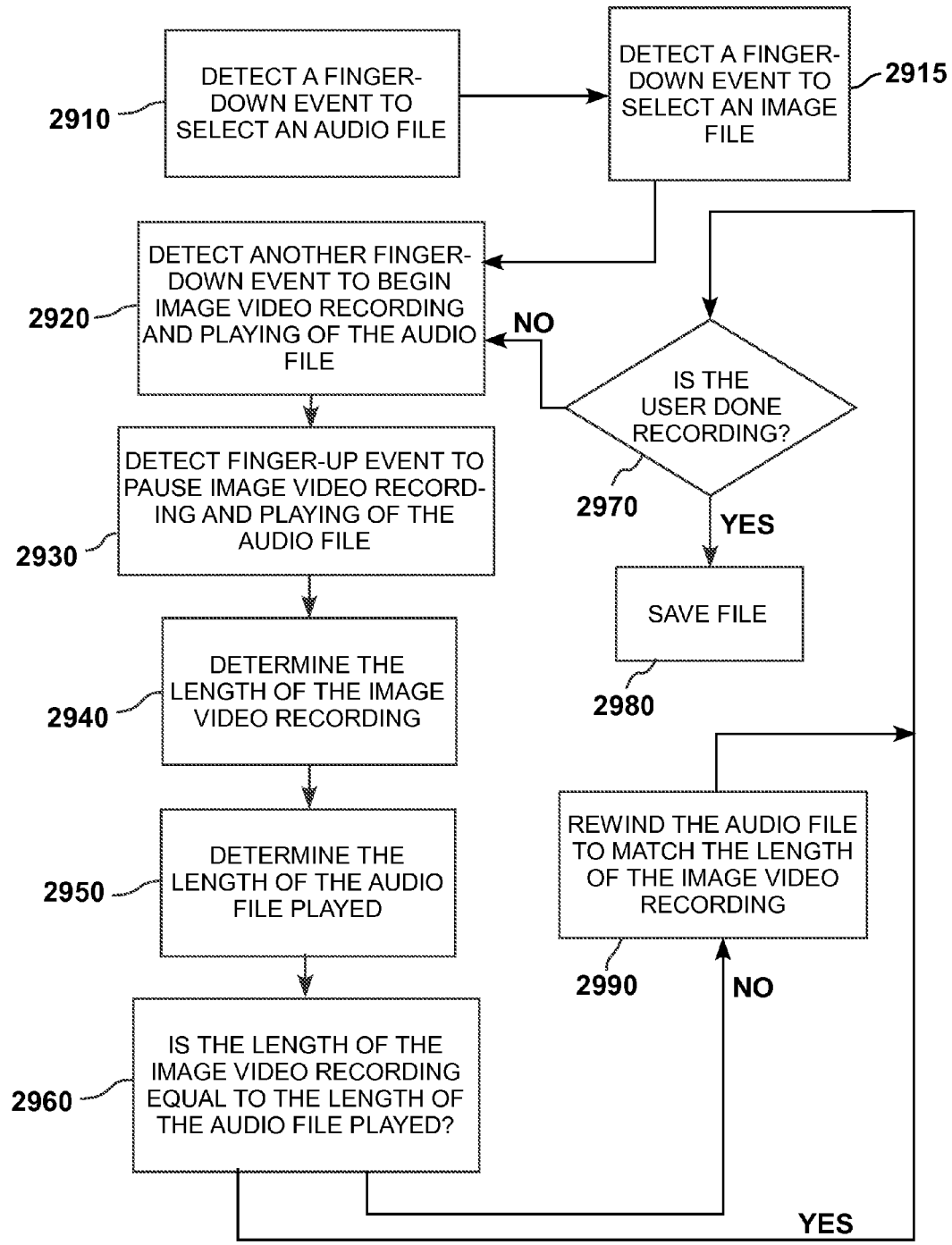
FIG. 29 depicts another process in accordance with some embodiments presently disclosed.

FIG. 29 depicts a flow diagram showing a process of recording a video of a picture in accordance with some embodiments. Referring to FIG. 29, in some embodiments, at 2910, a device detects a finger-down event to select an audio file. At 2915, the device detects a finger-down event to select an image file. At 2920, the device detects another finger-down event to begin image video recording and playing of the audio file. At 2930, the device detects a finger-up event to pause image video recording and playing of the audio file. At 2940, the device determines the length of the image video recording. At 2950, the device determines the length of the audio file played. At 2960, the device compares the length of the image video recording with the length of the audio file played. At 2990, the device rewinds the audio file to match the length of the image video recording if the length of the audio file is less than the length of the image video recording.

Figure 34:
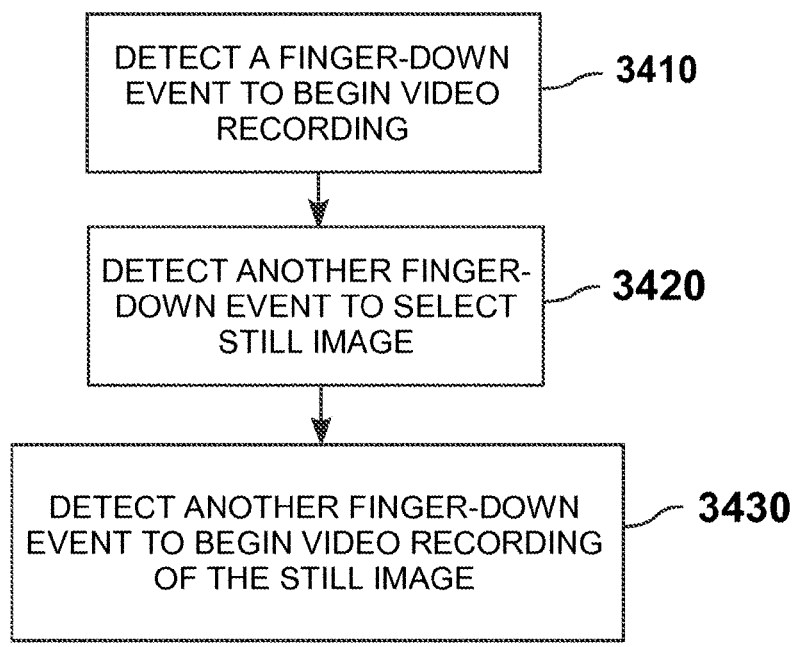
FIG. 34 depicts another process in accordance with some embodiments presently disclosed.

FIG. 34 depicts a flow diagram showing another process of recording a video in accordance with some embodiments. Referring to FIG. 34, at 3410, a device detects a finger-down event to begin video recording through an optical sensor 164. In some embodiments, the device is configured to play an audio file during the video recording. At 3420, the device detects another finger-down event to select and display a still image on the touch screen 112. At 3430, the device detects another finger-down event to begin video recording of the still image displayed on the touch screen 112. In some embodiments, the device is configured to play the audio file during the video recording of the still image displayed on the touch screen 112. In some embodiments, the device is configured to record user's voice during the video recording of the still image displayed on the touch screen 112.

Figure 35:
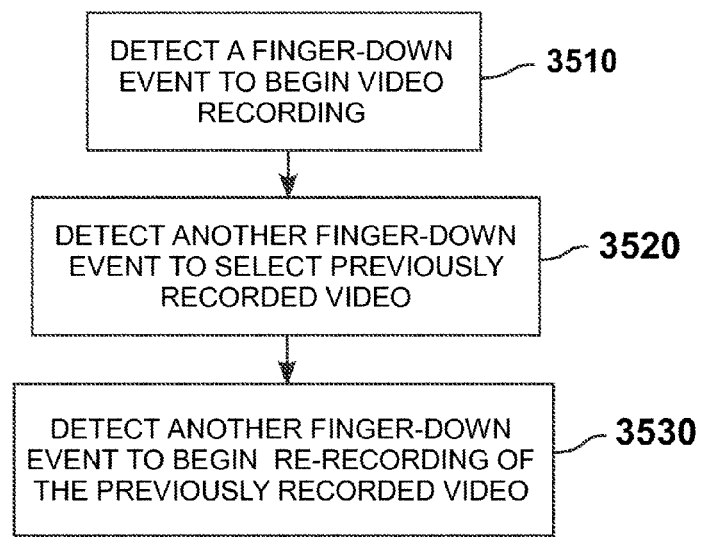
FIG. 35 depicts another process in accordance with some embodiments presently disclosed.

FIG. 35 depicts a flow diagram showing another process of recording a video in accordance with some embodiments. Referring to FIG. 35, at 3510, a device detects a finger-down event to begin video recording through an optical sensor 164. In some embodiments, the device is configured to play an audio file during the video recording. At 3520, the device detects another finger-down event to select and display a previously recorded video on the touch screen 112. At 3530, the device detects another finger-down event to begin playing the previously recorded video on the touch screen 112 and re-recording the previously recorded video being played on the touch screen 112. In some embodiments, the device is configured to play the audio file during the re-recording of the previously recorded video being played on the touch screen 112. In some embodiments, the device is configured to record user's voice during the re-recording of the previously recorded video being played on the touch screen 112. In some embodiments, the device is configured to play audio of the previously recorded video during the re-recording of the previously recorded video being played on the touch screen 112.

Figure 36:
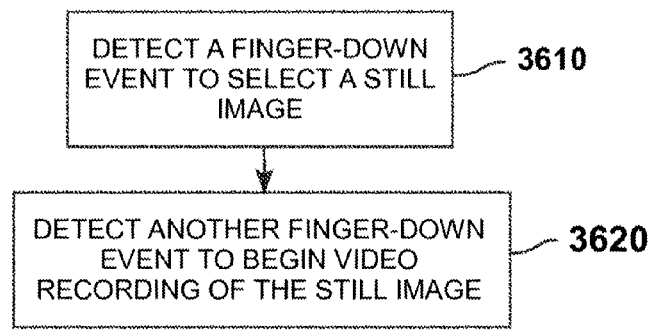
FIG. 36 depicts another process in accordance with some embodiments presently disclosed.

FIG. 36 depicts a flow diagram showing another process of recording a video in accordance with some embodiments. Referring to FIG. 36, at 3610, a device detects a finger-down event to select and display a still image on the touch screen 112. At 3620, the device detects another finger-down event to begin video recording of the still image displayed on the touch screen 112. In some embodiments, the device is configured to play an audio file during the video recording of the still image displayed on the touch screen 112. In some embodiments, the device is configured to record user's voice during the video recording of the still image displayed on the touch screen 112.

Figure 37:
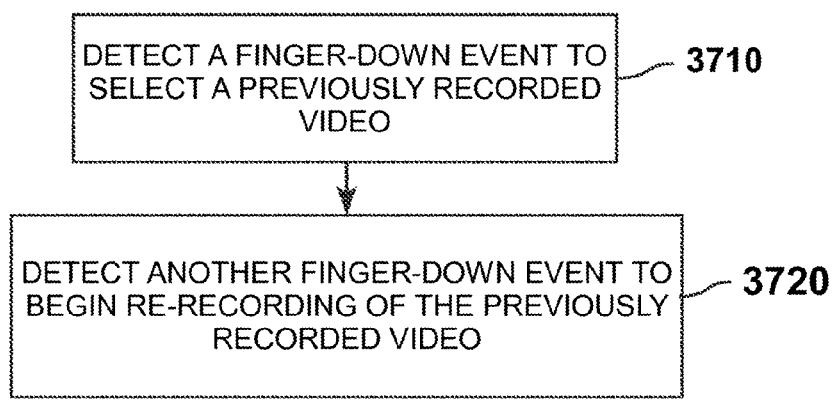
FIG. 37 depicts another process in accordance with some embodiments presently disclosed.

FIG. 37 depicts a flow diagram showing another process of recording a video in accordance with some embodiments. Referring to FIG. 37, at 3710, a device detects a finger-down event to select and display a previously recorded video on the touch screen 112. At 3720, the device detects another finger-down event to begin playing the previously recorded video on the touch screen 112 and re-recording at least a portion of the previously recorded video being played on the touch screen 112. In some embodiments, the device is configured to play an audio file during the re-recording of the previously recorded video being played on the touch screen 112. In some embodiments, the device is configured to record user's voice during the re-recording of the previously recorded video being played on the touch screen 112. In some embodiments, the device is configured to play audio of the previously recorded video during the re-recording of the previously recorded video being played on the touch screen 112.

According to one aspect, a computer implemented method is presently disclosed. The method comprises at an electronic device with a touch-sensitive display, displaying a still image on the touch-sensitive display; while displaying the still image, detecting user's finger contact with the touch-sensitive display; and in response to detecting the user's finger contact, video recording the still image.

According to a second aspect, a computer implemented method is presently disclosed. The method comprises at an electronic device with a touch-sensitive display, displaying a pre-recorded video on the touch-sensitive display; while displaying the pre-recorded video, detecting user's finger contact with the touch-sensitive display; in response to detecting the user's finger contact, start playing at least a portion of the pre-recorded video on the touch-sensitive display; and video recording at least the portion of the pre-recorded video playing on the touch-sensitive display.

According to a third aspect, a computer implemented method is presently disclosed. The method comprises at an electronic device with a touch-sensitive display, detecting user's finger contact with the touch-sensitive display; in response to detecting the user's finger contact, capturing visual media through at least one optical sensor; and in response to detecting the user's finger contact, playing an audio file through a speaker.

In some embodiments, recording process involves input from touch-sensitive display system for start/stop. Video recording is done by capturing data from optical sensor, optical sensor controller, peripherals interface, and stored in memory as video buffers. At the end of each recording, video buffers are joined in to a single video file that remains in memory. The video file is then re-encoded frame by frame and once processed saved to disk. Once all recordings are complete, video files are demuxed (joined) in to a single video file. An additional (optional) audio track is then read in to memory from disk and processed and mixed with the audio track of the video file previously written to disk (now pulled back in to memory) and re-saved to disk. If user is recording with microphone audio, while optical sensor is receiving video data, the audio circuitry is reading audio samples and which are added as a track to the video file container. If user is recording with a soundtrack, the audio circuitry speaker plays the audio that is read from disk and is mixed in after recording as mentioned above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . ."

What is claimed is:

1. A computer implemented method, comprising: at an electronic device with a touch-sensitive display,
    detecting user's finger contact with the touch-sensitive display;
    in response to detecting the user's finger contact, capturing visual media through at least one optical sensor;
    in response to detecting the user's finger contact, playing an audio file through a speaker;
    detecting removal of the user's finger contact with the touch-sensitive display;
    in response to the removal of the user's finger contact, pausing capturing visual media and pausing playing the audio file;
    detecting another finger contact with the touch-sensitive display; and
    in response to the another finger contact, resuming capturing visual media and recording user's voice.

2. The computer implemented method of claim 1, wherein the speaker is associated with the electronic device.

3. The computer implemented method of claim 1, further comprising:
- in response to detecting removal of the user's finger contact, comparing the length of the video recording with the length of the audio file played;
- adjusting the length of the audio file played to match the length of the video recording.

\* \* \* \* \*